United States Patent
Allen et al.

(10) Patent No.: US 10,783,588 B1
(45) Date of Patent: *Sep. 22, 2020

(54) IDENTIFYING AND RECOMMENDING INSURANCE POLICY PRODUCTS/SERVICES USING INFORMATIC SENSOR DATA

(71) Applicant: UNITED SERVICES AUTOMOBILE ASSOCIATION, San Antonio, TX (US)

(72) Inventors: Michael J. Allen, San Antonio, TX (US); Ramsey Devereaux, San Antonio, TX (US); Spencer Read, Helotes, TX (US); David S. Franck, San Antonio, TX (US); William Chandler, San Antonio, TX (US); Daniela Wheeler, Borne, TX (US); Kathleen L. Swain, Peoria, AZ (US); Cleburne R. Burgess, Fair Oaks Ranch, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 160 days.

This patent is subject to a terminal disclaimer.

(21) Appl. No.: 15/912,465

(22) Filed: Mar. 5, 2018

Related U.S. Application Data

(63) Continuation of application No. 14/251,411, filed on Apr. 11, 2014, now Pat. No. 9,947,051.

(Continued)

(51) Int. Cl.
*G06Q 40/08* (2012.01)

(52) U.S. Cl.
CPC .................................. *G06Q 40/08* (2013.01)

(58) Field of Classification Search
CPC ........ G06Q 10/00; G06Q 20/00; G06Q 30/00; G06Q 40/00
(Continued)

(56) References Cited

U.S. PATENT DOCUMENTS

| | | |
|---|---|---|
| 5,182,705 A | 1/1993 | Barr et al. |
| 5,235,507 A | 8/1993 | Sackler et al. |

(Continued)

FOREIGN PATENT DOCUMENTS

| | | |
|---|---|---|
| AT | 503861 B1 | 6/2008 |
| CA | 2478911 A1 | 9/2003 |

(Continued)

OTHER PUBLICATIONS

Gatzert et al., "Assessing the Risks of Insuring Reputation Risk", The Journal of Risk and Insurance, vol. 83, No. 3, pp. 641-679 (Year: 2016).*

(Continued)

*Primary Examiner* — Frantzy Poinvil
(74) *Attorney, Agent, or Firm* — Fletcher Yoder, P.C.

(57) ABSTRACT

A computer system and method for processing insurance claim data to identify and recommend insurance policy modifications using informatic data from one or more informatic sensor devices relating to a dwelling. Analytical analysis is performed on the received informatic data to determine a dwelling assessment value regarding an insurance risk relating to the dwelling. Electronic data relating to an insurance policy associated with the dwelling is received by a computer processor and is electronically analyzed to determine insurance coverage and liability values for the dwelling as prescribed by the insurance policy. Predefined business rules are utilized by a computer processor using at least the dwelling assessment value and the determined insurance coverage and liability values for the dwelling to (Continued)

determine, and preferably recommend, one or more insurance products for inclusion with the insurance policy to mitigate insuree liability regarding the dwelling.

20 Claims, 5 Drawing Sheets

Related U.S. Application Data

(60) Provisional application No. 61/948,192, filed on Mar. 5, 2014, provisional application No. 61/943,897, filed on Feb. 24, 2014, provisional application No. 61/943,901, filed on Feb. 24, 2014, provisional application No. 61/943,906, filed on Feb. 24, 2014, provisional application No. 61/926,532, filed on Jan. 13, 2014, provisional application No. 61/926,541, filed on Jan. 13, 2014, provisional application No. 61/926,536, filed on Jan. 13, 2014, provisional application No. 61/926,534, filed on Jan. 13, 2014, provisional application No. 61/926,103, filed on Jan. 10, 2014, provisional application No. 61/926,095, filed on Jan. 10, 2014, provisional application No. 61/926,111, filed on Jan. 10, 2014, provisional application No. 61/926,118, filed on Jan. 10, 2014, provisional application No. 61/926,119, filed on Jan. 10, 2014, provisional application No. 61/926,121, filed on Jan. 10, 2014, provisional application No. 61/926,123, filed on Jan. 10, 2014, provisional application No. 61/926,091, filed on Jan. 10, 2014, provisional application No. 61/926,108, filed on Jan. 10, 2014, provisional application No. 61/924,114, filed on Jan. 10, 2014, provisional application No. 61/926,093, filed on Jan. 10, 2014, provisional application No. 61/926,098, filed on Jan. 10, 2014.

(58) Field of Classification Search
USPC .................................................. 705/3–44
See application file for complete search history.

(56) References Cited

U.S. PATENT DOCUMENTS

| | | | |
|---|---|---|---|
| 5,325,291 A | 6/1994 | Garrett et al. | |
| 5,526,609 A | 6/1996 | Lee et al. | |
| 5,724,261 A | 3/1998 | Denny et al. | |
| 5,950,169 A | 9/1999 | Borghesi et al. | |
| 5,960,338 A | 9/1999 | Foti | |
| 5,991,733 A | 11/1999 | Aleia et al. | |
| 6,029,141 A | 2/2000 | Bezos et al. | |
| 6,049,773 A | 4/2000 | McCormack et al. | |
| 6,141,686 A | 10/2000 | Jackowski et al. | |
| 6,526,807 B1 | 3/2003 | Doumit et al. | |
| 6,686,838 B1 | 2/2004 | Rezvani et al. | |
| 6,766,322 B1 | 7/2004 | Bell | |
| 6,826,607 B1 | 11/2004 | Gelvin et al. | |
| 6,985,907 B2 | 1/2006 | Zambo et al. | |
| 7,015,789 B1 | 3/2006 | Helgeson | |
| 7,138,914 B2 | 11/2006 | Culpepper et al. | |
| 7,142,099 B2 | 11/2006 | Ross et al. | |
| 7,170,418 B2 | 1/2007 | Rose-Pehrsson et al. | |
| 7,203,654 B2 | 4/2007 | Menendez | |
| 7,398,218 B1 | 7/2008 | Bemaski et al. | |
| 7,406,436 B1 | 7/2008 | Reisman | |
| 7,533,032 B1 * | 5/2009 | Selby | G06Q 10/02 705/5 |
| 7,602,196 B2 | 10/2009 | Vokey | |
| 7,610,210 B2 | 10/2009 | Helitzer et al. | |
| 7,624,031 B2 | 11/2009 | Simpson et al. | |
| 7,624,069 B2 | 11/2009 | Padgette | |
| 7,711,584 B2 | 5/2010 | Helitzer et al. | |
| 7,716,076 B1 | 5/2010 | Block et al. | |
| 7,739,133 B1 | 6/2010 | Hail et al. | |
| 7,809,587 B2 | 10/2010 | Dorai et al. | |
| 7,869,944 B2 | 1/2011 | Deaton et al. | |
| 7,885,831 B2 | 2/2011 | Burton et al. | |
| 7,899,560 B2 | 3/2011 | Eck | |
| 7,937,437 B2 | 5/2011 | Fujii | |
| 7,945,497 B2 | 5/2011 | Kenefick et al. | |
| 7,949,548 B2 | 5/2011 | Mathai et al. | |
| 7,958,184 B2 | 6/2011 | Barsness et al. | |
| 7,969,296 B1 | 6/2011 | Stell | |
| 8,004,404 B2 | 8/2011 | Izumi et al. | |
| 8,041,636 B1 | 10/2011 | Hunter et al. | |
| 8,046,243 B2 | 10/2011 | Winkler | |
| 8,069,181 B1 | 11/2011 | Krishnan et al. | |
| 8,081,795 B2 | 12/2011 | Brown | |
| 8,086,523 B1 | 12/2011 | Palmer | |
| 8,090,598 B2 | 1/2012 | Bauer et al. | |
| 8,095,394 B2 | 1/2012 | Nowak et al. | |
| 8,103,527 B1 | 1/2012 | Lasalle et al. | |
| 8,106,769 B1 | 1/2012 | Maroney et al. | |
| 8,172,154 B1 * | 5/2012 | Figley | F24F 11/30 236/44 A |
| 8,229,767 B2 | 7/2012 | Birchall | |
| 8,249,968 B1 | 8/2012 | Oldham et al. | |
| 8,265,963 B1 | 9/2012 | Hanson et al. | |
| 8,271,303 B2 | 9/2012 | Helitzer et al. | |
| 8,271,308 B2 | 9/2012 | Winkler | |
| 8,271,321 B1 | 9/2012 | Kestenbaum | |
| 8,289,160 B1 | 10/2012 | Billman | |
| 8,294,567 B1 | 10/2012 | Stell | |
| 8,306,258 B2 | 11/2012 | Brown | |
| 8,332,242 B1 | 12/2012 | Medina, III | |
| 8,332,348 B1 | 12/2012 | Avery | |
| 8,384,538 B2 | 2/2013 | Breed | |
| 8,400,299 B1 | 3/2013 | Maroney et al. | |
| 8,428,972 B1 | 4/2013 | Noles et al. | |
| 8,452,678 B2 | 5/2013 | Feldman et al. | |
| 8,510,196 B1 | 8/2013 | Brandmaier et al. | |
| 8,515,788 B2 | 8/2013 | Tracy et al. | |
| 8,521,542 B1 | 8/2013 | Stotts | |
| 8,527,306 B1 | 9/2013 | Reeser et al. | |
| 8,600,104 B2 | 12/2013 | Brown | |
| 8,635,091 B2 | 1/2014 | Amigo et al. | |
| 8,638,228 B2 | 1/2014 | Amigo et al. | |
| 8,650,048 B1 | 2/2014 | Hopkins, III et al. | |
| 8,676,612 B2 | 3/2014 | Helitzer et al. | |
| 8,719,061 B2 | 5/2014 | Birchall | |
| 8,731,975 B2 | 5/2014 | English et al. | |
| 8,760,285 B2 | 6/2014 | Billman et al. | |
| 8,774,525 B2 | 7/2014 | Pershing | |
| 8,782,395 B1 | 7/2014 | Ly | |
| 8,788,299 B1 | 7/2014 | Medina, III | |
| 8,788,301 B1 | 7/2014 | Marlow et al. | |
| 8,799,034 B1 | 8/2014 | Brandmaier et al. | |
| 8,812,414 B2 | 8/2014 | Arthur et al. | |
| 8,813,065 B2 | 8/2014 | Zygmuntowicz et al. | |
| 8,868,541 B2 | 10/2014 | Lin et al. | |
| 8,872,818 B2 | 10/2014 | Freeman et al. | |
| 8,910,298 B2 * | 12/2014 | Gettings | G08B 23/00 726/26 |
| 8,924,241 B2 | 12/2014 | Grosso | |
| 8,930,581 B2 | 1/2015 | Anton et al. | |
| 9,015,238 B1 | 4/2015 | Anton et al. | |
| 9,049,168 B2 | 6/2015 | Jacob et al. | |
| 9,053,516 B2 | 6/2015 | Stempora | |
| 9,082,015 B2 | 7/2015 | Christopulos et al. | |
| 9,141,995 B1 | 9/2015 | Brinkmann et al. | |
| 9,158,869 B2 | 10/2015 | Labrie et al. | |
| 9,165,084 B2 | 10/2015 | Isberg et al. | |
| 9,183,560 B2 | 11/2015 | Abelow | |
| 9,252,980 B2 | 2/2016 | Raman | |
| 9,311,676 B2 | 4/2016 | Helitzer et al. | |
| 9,330,550 B2 | 5/2016 | Zribi et al. | |
| 9,363,322 B1 | 6/2016 | Anton et al. | |
| 9,454,907 B2 | 9/2016 | Hafeez et al. | |
| 9,460,471 B2 | 10/2016 | Bernard et al. | |
| 9,481,459 B2 | 11/2016 | Staskevich et al. | |
| 9,611,038 B2 | 4/2017 | Dahlstrom | |

(56) References Cited

U.S. PATENT DOCUMENTS

| | | |
|---|---|---|
| 9,613,523 B2 | 4/2017 | Davidson et al. |
| 9,628,958 B1 * | 4/2017 | McBurney ............ H04W 4/027 |
| 9,652,805 B1 | 5/2017 | Clawson, II et al. |
| 9,665,074 B2 | 5/2017 | Lentzitzky |
| 9,710,858 B1 | 7/2017 | Devereaux et al. |
| 9,747,571 B2 | 8/2017 | Ballew et al. |
| 9,754,325 B1 | 9/2017 | Konrardy et al. |
| 9,792,656 B1 | 10/2017 | Konrardy et al. |
| 9,811,862 B1 * | 11/2017 | Allen ................ G06K 9/00637 |
| 9,818,158 B1 | 11/2017 | Devereaux et al. |
| 9,842,310 B2 | 12/2017 | Lekas |
| 9,886,723 B1 | 2/2018 | Devereaux et al. |
| 9,892,463 B1 | 2/2018 | Hakimi-Boushehri et al. |
| 9,934,675 B2 | 4/2018 | Coyne et al. |
| 9,947,051 B1 * | 4/2018 | Allen ................ G06K 9/00536 |
| 9,959,581 B2 | 5/2018 | Pershing |
| 9,984,417 B1 | 5/2018 | Allen et al. |
| 10,032,224 B2 | 7/2018 | Helitzer et al. |
| 10,055,793 B1 | 8/2018 | Call et al. |
| 10,055,794 B1 | 8/2018 | Konrardy et al. |
| 10,121,207 B1 | 11/2018 | Devereaux et al. |
| 10,163,162 B1 | 12/2018 | Devereaux et al. |
| 10,181,159 B1 | 1/2019 | Allen et al. |
| 2002/0007289 A1 | 1/2002 | Malin et al. |
| 2002/0032586 A1 | 3/2002 | Joao |
| 2002/0035528 A1 | 3/2002 | Simpson et al. |
| 2002/0049618 A1 | 4/2002 | McClure et al. |
| 2002/0055861 A1 | 5/2002 | King et al. |
| 2002/0087364 A1 | 7/2002 | Lerner et al. |
| 2002/0103622 A1 | 8/2002 | Burge |
| 2002/0111835 A1 | 8/2002 | Hele et al. |
| 2002/0116254 A1 | 8/2002 | Stein et al. |
| 2002/0129001 A1 | 9/2002 | Levkoff et al. |
| 2002/0178033 A1 | 11/2002 | Yoshioka et al. |
| 2003/0040934 A1 | 2/2003 | Skidmore et al. |
| 2003/0078816 A1 | 4/2003 | Filep |
| 2003/0097335 A1 | 5/2003 | Moskowitz et al. |
| 2003/0182441 A1 | 9/2003 | Andrew et al. |
| 2004/0019507 A1 | 1/2004 | Yaruss et al. |
| 2004/0034657 A1 | 2/2004 | Zambo et al. |
| 2004/0039586 A1 | 2/2004 | Garvey et al. |
| 2004/0046033 A1 | 3/2004 | Kolodziej et al. |
| 2004/0064345 A1 | 4/2004 | Ajamian et al. |
| 2004/0172304 A1 | 9/2004 | Joao |
| 2004/0181621 A1 | 9/2004 | Mathur et al. |
| 2004/0260406 A1 | 12/2004 | Ljunggren et al. |
| 2005/0050017 A1 | 3/2005 | Ross et al. |
| 2005/0055248 A1 | 3/2005 | Helitzer et al. |
| 2005/0055249 A1 | 3/2005 | Helitzer et al. |
| 2005/0057365 A1 | 3/2005 | Qualey |
| 2005/0128074 A1 | 6/2005 | Culpepper et al. |
| 2005/0197847 A1 | 9/2005 | Smith |
| 2005/0226273 A1 | 10/2005 | Qian |
| 2005/0251427 A1 | 11/2005 | Dorai et al. |
| 2005/0278082 A1 | 12/2005 | Weekes |
| 2006/0017558 A1 | 1/2006 | Albert et al. |
| 2006/0026044 A1 | 2/2006 | Smith |
| 2006/0052905 A1 | 3/2006 | Pfingsten et al. |
| 2006/0111874 A1 | 5/2006 | Curtis et al. |
| 2006/0200008 A1 | 9/2006 | Moore-Ede |
| 2006/0218018 A1 | 9/2006 | Schmitt |
| 2006/0219705 A1 | 10/2006 | Beier et al. |
| 2006/0229923 A1 | 10/2006 | Adi et al. |
| 2006/0235611 A1 | 10/2006 | Deaton et al. |
| 2007/0005400 A1 | 1/2007 | Eggenberger et al. |
| 2007/0005404 A1 | 1/2007 | Raz et al. |
| 2007/0043803 A1 | 2/2007 | Whitehouse et al. |
| 2007/0088579 A1 | 4/2007 | Richards |
| 2007/0100669 A1 | 5/2007 | Wargin et al. |
| 2007/0118399 A1 | 5/2007 | Avinash et al. |
| 2007/0136078 A1 | 6/2007 | Plante |
| 2007/0150319 A1 | 6/2007 | Menendez |
| 2007/0156463 A1 | 7/2007 | Burton et al. |
| 2007/0161940 A1 | 7/2007 | Blanchard et al. |
| 2007/0174467 A1 | 7/2007 | Ballou et al. |
| 2007/0214023 A1 | 9/2007 | Mathai et al. |
| 2007/0282639 A1 | 12/2007 | Leszuk et al. |
| 2007/0299677 A1 | 12/2007 | Maertz |
| 2008/0033847 A1 | 2/2008 | McIntosh |
| 2008/0052134 A1 | 2/2008 | Nowak et al. |
| 2008/0065427 A1 | 3/2008 | Helitzer et al. |
| 2008/0077451 A1 | 3/2008 | Anthony et al. |
| 2008/0086320 A1 | 4/2008 | Bellew et al. |
| 2008/0114655 A1 | 5/2008 | Skidmore |
| 2008/0140857 A1 | 6/2008 | Conner et al. |
| 2008/0154651 A1 | 6/2008 | Kenefick et al. |
| 2008/0154686 A1 | 6/2008 | Vicino |
| 2008/0154851 A1 | 6/2008 | Jean |
| 2008/0154886 A1 | 6/2008 | Podowski et al. |
| 2008/0164769 A1 | 7/2008 | Eck |
| 2008/0243558 A1 | 10/2008 | Gupte |
| 2008/0244329 A1 | 10/2008 | Shinbo et al. |
| 2008/0282817 A1 | 11/2008 | Breed |
| 2008/0306799 A1 | 12/2008 | Sopko, III et al. |
| 2008/0307104 A1 | 12/2008 | Amini et al. |
| 2008/0319787 A1 | 12/2008 | Stivoric et al. |
| 2009/0006175 A1 | 1/2009 | Maertz |
| 2009/0024420 A1 | 1/2009 | Winkler |
| 2009/0031175 A1 | 1/2009 | Aggarwal et al. |
| 2009/0109037 A1 | 4/2009 | Farmer |
| 2009/0119132 A1 | 5/2009 | Bolano et al. |
| 2009/0135009 A1 | 5/2009 | Little et al. |
| 2009/0177500 A1 | 7/2009 | Swahn |
| 2009/0188202 A1 | 7/2009 | Vokey |
| 2009/0205054 A1 | 8/2009 | Blotenberg et al. |
| 2009/0216349 A1 | 8/2009 | Kwon et al. |
| 2009/0240531 A1 | 9/2009 | Hilborn |
| 2009/0240550 A1 | 9/2009 | McCarty |
| 2009/0265193 A1 | 10/2009 | Collins et al. |
| 2009/0265207 A1 | 10/2009 | Johnson |
| 2009/0266565 A1 | 10/2009 | Char |
| 2009/0279734 A1 | 11/2009 | Brown |
| 2009/0287509 A1 | 11/2009 | Basak et al. |
| 2010/0030586 A1 | 2/2010 | Taylor et al. |
| 2010/0049552 A1 | 2/2010 | Fini et al. |
| 2010/0131300 A1 | 5/2010 | Collopy et al. |
| 2010/0131307 A1 | 5/2010 | Collopy et al. |
| 2010/0174566 A1 | 7/2010 | Helitzer et al. |
| 2010/0241464 A1 | 9/2010 | Amigo et al. |
| 2010/0274590 A1 | 10/2010 | Compangano et al. |
| 2010/0274859 A1 | 10/2010 | Bucuk |
| 2010/0299161 A1 | 11/2010 | Burdick et al. |
| 2010/0299162 A1 | 11/2010 | Kwan |
| 2011/0043958 A1 | 2/2011 | Nakamura et al. |
| 2011/0061697 A1 | 3/2011 | Behrenbruch et al. |
| 2011/0112848 A1 | 5/2011 | Beraja et al. |
| 2011/0137684 A1 | 6/2011 | Peak et al. |
| 2011/0137685 A1 | 6/2011 | Tracy et al. |
| 2011/0137885 A1 | 6/2011 | Isberg et al. |
| 2011/0161117 A1 | 6/2011 | Busque et al. |
| 2011/0161119 A1 | 6/2011 | Collins |
| 2011/0295624 A1 | 12/2011 | Chapin et al. |
| 2011/0320226 A1 | 12/2011 | Graziano et al. |
| 2012/0004935 A1 | 1/2012 | Winkler |
| 2012/0016695 A1 | 1/2012 | Bernard et al. |
| 2012/0022897 A1 | 1/2012 | Shafer |
| 2012/0025994 A1 | 2/2012 | Morris |
| 2012/0028635 A1 | 2/2012 | Borg et al. |
| 2012/0028835 A1 | 2/2012 | Wild et al. |
| 2012/0046975 A1 | 2/2012 | Stolze |
| 2012/0072240 A1 | 3/2012 | Grosso et al. |
| 2012/0096149 A1 | 4/2012 | Sunkara et al. |
| 2012/0101855 A1 | 4/2012 | Collins et al. |
| 2012/0116820 A1 | 5/2012 | English et al. |
| 2012/0130751 A1 | 5/2012 | McHugh et al. |
| 2012/0143634 A1 | 6/2012 | Beyda et al. |
| 2012/0158436 A1 | 6/2012 | Bauer et al. |
| 2012/0176237 A1 | 7/2012 | Tabe |
| 2012/0215568 A1 | 8/2012 | Vahidi et al. |
| 2012/0290333 A1 | 11/2012 | Birchall |
| 2012/0311053 A1 | 12/2012 | Labrie et al. |
| 2012/0311614 A1 | 12/2012 | DeAnna et al. |
| 2012/0323609 A1 | 12/2012 | Fini |
| 2013/0006608 A1 | 1/2013 | Dehors et al. |

(56) References Cited

U.S. PATENT DOCUMENTS

| | | |
|---|---|---|
| 2013/0018936 A1 | 1/2013 | DAmico et al. |
| 2013/0040636 A1 | 2/2013 | Borg et al. |
| 2013/0040836 A1 | 2/2013 | Himmler et al. |
| 2013/0055060 A1 | 2/2013 | Folsom et al. |
| 2013/0060583 A1 | 3/2013 | Collins et al. |
| 2013/0073303 A1 | 3/2013 | Hsu |
| 2013/0144658 A1 | 6/2013 | Schnabolk et al. |
| 2013/0144858 A1 | 6/2013 | Lin et al. |
| 2013/0182002 A1 | 7/2013 | Macciola et al. |
| 2013/0185716 A1 | 7/2013 | Yin et al. |
| 2013/0197945 A1 | 8/2013 | Anderson |
| 2013/0201018 A1 | 8/2013 | Horstemeyer et al. |
| 2013/0226623 A1 | 8/2013 | Diana et al. |
| 2013/0226624 A1 | 8/2013 | Blessman et al. |
| 2013/0245796 A1 | 9/2013 | Lentzitzky et al. |
| 2013/0253961 A1 | 9/2013 | Feldman et al. |
| 2013/0268358 A1 | 10/2013 | Haas |
| 2013/0282408 A1 | 10/2013 | Snyder et al. |
| 2013/0317732 A1 | 11/2013 | Borg et al. |
| 2014/0040343 A1 | 2/2014 | Nickolov et al. |
| 2014/0046701 A1 | 2/2014 | Steinberg et al. |
| 2014/0050147 A1 | 2/2014 | Beale |
| 2014/0058761 A1 | 2/2014 | Freiberger et al. |
| 2014/0067137 A1 | 3/2014 | Amelio et al. |
| 2014/0081675 A1 | 3/2014 | Ives et al. |
| 2014/0089156 A1 | 3/2014 | Williams et al. |
| 2014/0089990 A1 | 3/2014 | van Deventer et al. |
| 2014/0108275 A1 | 4/2014 | Heptonstall |
| 2014/0114693 A1 | 4/2014 | Helitzer et al. |
| 2014/0114893 A1 | 4/2014 | Arthur et al. |
| 2014/0123292 A1 | 5/2014 | Schmidt et al. |
| 2014/0123309 A1 | 5/2014 | Jung et al. |
| 2014/0132409 A1 | 5/2014 | Billman et al. |
| 2014/0136242 A1* | 5/2014 | Weekes ............... G06Q 40/08 705/4 |
| 2014/0142989 A1 | 5/2014 | Grosso |
| 2014/0149485 A1 | 5/2014 | Sharma et al. |
| 2014/0180723 A1 | 6/2014 | Cote et al. |
| 2014/0192646 A1 | 7/2014 | Mir et al. |
| 2014/0195272 A1 | 7/2014 | Sadig et al. |
| 2014/0201072 A1 | 7/2014 | Reeser et al. |
| 2014/0201315 A1 | 7/2014 | Jacob et al. |
| 2014/0214458 A1 | 7/2014 | Vahidi et al. |
| 2014/0257862 A1 | 9/2014 | Billman et al. |
| 2014/0257863 A1 | 9/2014 | Maastricht et al. |
| 2014/0266669 A1 | 9/2014 | Fadell et al. |
| 2014/0270492 A1 | 9/2014 | Christopulos et al. |
| 2014/0278573 A1 | 9/2014 | Cook |
| 2014/0279593 A1 | 9/2014 | Pershing |
| 2014/0280457 A1 | 9/2014 | Anton et al. |
| 2014/0304007 A1 | 10/2014 | Kimball et al. |
| 2014/0316614 A1 | 10/2014 | Newman |
| 2014/0322676 A1 | 10/2014 | Raman |
| 2014/0327995 A1 | 11/2014 | Panjwani et al. |
| 2014/0334492 A1 | 11/2014 | Mack-Crane |
| 2014/0358592 A1* | 12/2014 | Wedig ............... G06Q 40/08 705/4 |
| 2014/0371941 A1 | 12/2014 | Keller et al. |
| 2014/0375440 A1 | 12/2014 | Rezvani et al. |
| 2014/0380264 A1 | 12/2014 | Misra et al. |
| 2015/0006206 A1 | 1/2015 | Mdeway |
| 2015/0019266 A1 | 1/2015 | Stempora |
| 2015/0025915 A1 | 1/2015 | Lekas |
| 2015/0025917 A1 | 1/2015 | Stempora |
| 2015/0026074 A1 | 1/2015 | Cotten |
| 2015/0112504 A1 | 4/2015 | Binion et al. |
| 2015/0154709 A1 | 6/2015 | Cook |
| 2015/0154712 A1 | 6/2015 | Cook |
| 2015/0154715 A1* | 6/2015 | Wedig ............... G06Q 40/08 705/4 |
| 2015/0161738 A1 | 6/2015 | Stempora |
| 2015/0221051 A1 | 8/2015 | Settino |
| 2015/0332407 A1 | 11/2015 | Wilson et al. |
| 2015/0339911 A1 | 11/2015 | Coyne et al. |
| 2015/0370272 A1 | 12/2015 | Reddy et al. |
| 2015/0372832 A1 | 12/2015 | Kortz et al. |
| 2016/0005130 A1 | 1/2016 | Devereaux et al. |
| 2016/0039921 A1 | 2/2016 | Luo et al. |
| 2016/0055594 A1 | 2/2016 | Emison |
| 2016/0067547 A1 | 3/2016 | Anthony et al. |
| 2016/0071148 A1* | 3/2016 | Joshi ............... G06Q 30/0269 705/14.5 |
| 2016/0071219 A1* | 3/2016 | Joshi ............... G06Q 30/0269 705/4 |
| 2016/0104250 A1 | 4/2016 | Allen et al. |
| 2016/0125170 A1 | 5/2016 | Abramowitz |
| 2016/0163186 A1 | 6/2016 | Davidson et al. |
| 2016/0225098 A1 | 8/2016 | Helitzer et al. |
| 2017/0178424 A1 | 6/2017 | Wright |
| 2017/0365008 A1 | 12/2017 | Schreier et al. |

FOREIGN PATENT DOCUMENTS

| | | |
|---|---|---|
| CA | 2518482 C | 3/2007 |
| CA | 2805226 A1 | 8/2013 |
| CA | 2882086 A1 | 2/2014 |
| CN | 103203054 B | 7/2013 |
| DE | 102005015028 B4 | 10/2006 |
| DE | 102008008317 A1 | 8/2009 |
| EP | 722145 A1 | 7/1996 |
| EP | 0722145 A1 | 7/1996 |
| EP | 1790057 B1 | 5/2012 |
| EP | 2795757 A4 | 10/2014 |
| EP | 2276135 B1 | 4/2015 |
| EP | 3255613 A1 | 12/2017 |
| GB | 2449510 A | 11/2008 |
| JP | 3282937 B2 | 5/2002 |
| JP | 2002358425 A | 12/2002 |
| JP | 2008250594 A | 10/2008 |
| KR | 20090090461 A | 8/2009 |
| MX | 337513 B | 8/2009 |
| RU | 2015109725 A | 10/2016 |
| WO | 2004034232 A2 | 4/2004 |
| WO | 2006074682 A2 | 7/2006 |
| WO | 2010136163 A1 | 12/2010 |
| WO | 2012075442 A1 | 6/2012 |
| WO | 2013/036677 A1 | 3/2013 |
| WO | 2013036677 A1 | 3/2013 |

OTHER PUBLICATIONS

U.S. Appl. No. 14/494,207, filed Sep. 23, 2014, Campbell.
U.S. Appl. No. 14/572,413, filed Dec. 16, 2014, Devereaux et al.
U.S. Appl. No. 14/573,981, filed Dec. 15, 2014, Allen et al.
U.S. Appl. No. 14/862,776, filed Sep. 23, 2015, Devereaux et al.
U.S. Appl. No. 14/941,225, filed Nov. 13, 2015, Billman et al.
U.S. Appl. No. 14/941,262, filed Nov. 13, 2015, Hopkins et al.
U.S. Appl. No. 15/244,847, filed Aug. 23, 2016, Devereaux et al.
U.S. Appl. No. 15/365,555, filed Nov. 30, 2016, Devereaux et al.
U.S. Appl. No. 15/365,611, filed Nov. 30, 2016, Devereaux et al.
U.S. Appl. No. 15/365,676, filed Nov. 30, 2016, Devereaux et al.
U.S. Appl. No. 15/365,706, filed Nov. 30, 2016, Devereaux et al.
U.S. Appl. No. 15/365,721, filed Nov. 30, 2016, Devereaux et al.
U.S. Appl. No. 15/365,725, filed Nov. 30, 2016, Devereaux et al.
U.S. Appl. No. 15/365,736, filed Nov. 30, 2016, Devereaux et al.
U.S. Appl. No. 15/365,745, filed Nov. 30, 2016, Devereaux et al.
U.S. Appl. No. 15/365,754, filed Nov. 30, 2016, Devereaux et al.
U.S. Appl. No. 15/365,764, filed Nov. 30, 2016, Devereaux et al.
U.S. Appl. No. 15/365,773, filed Nov. 30, 2016, Devereaux et al.
U.S. Appl. No. 15/365,786, filed Nov. 30, 2016, Devereaux et al.
Farmers Next Generation Homeowners Policy, Missouri, by Farmers insurance Exchange; 2008; 50 pages.
Gonzalez Ribeiro, Ana, "Surprising things your home insurance covers," Jan. 12, 2012 in Insurance; 4 pages.
"After an Auto Accident: Understanding the Claims Process," Financial Services Commission on Ontario, 2011, 10 pgs.
"Truck Crash Event Data Recorder Downloading," Crash Forensic; 2012, pp. 1-25.
Aiyagari, Sanjay et al., "AMQP Message Queuing Protocol Specification," Version Dec. 9, 2006. https://www.rabbitmq.com/resources/specs/amqp0-9.

(56) References Cited

OTHER PUBLICATIONS

Amanda Love, "How Recoverable Depreciation Works", Aug. 6, 2012, http://www.stateroofingtexas.com/recoverable-depreciation-works/.
AMQP is the Internet Protocol for Business Messaging Website. Jul. 4, 2011. https://web.archive.org/web/20110704212632/http://www.amqp.org/about/what.
Cloudera.com, "Migrating from MapReduce 1 (MRv1) to Map Reduce 2 (MRv2, YARN)", https://www.cloudera.com/documentation/enterprise/5-9-x/topics/cdh_ig_mapreduce_to_yarn_migrate.html, page generated Feb. 6, 2018.
Corbett et al., "Spanner: Google's Globally-Distributed Database," Google, Inc., pp. 1-14, 2012.
Das, Sudipto et al., "Ricardo: Integrating R and Hadoop," IBM Almaden Research Center, SIGMOD'10, Jun. 6-11, 2010.
Dean et al., "A New Age of Data Mining in the High-Performance World," SAS Institute Inc., 2012.
Deerwester et al., "Indexing by Latent Semantic Analysis," Journal of the American Society for Information Science, 1990.41 (6), pp. 391-407.
Fong et al., "Toward a scale-out data-management middleware for low-latency enterprise computing," IBM J. RES & DEV. vol. 57, No. 3/4 Paper, May 6/Jul. 2013.
Glennon, Jr., John C.; "Motor Vehicle Crash Investigation and Reconstruction," BSAT, 2001, 4 pgs.
Hopkins, Brian, "Big Opportunities in Big Data Positioning Your Firm to Capitalize in a Sea of Information," Enterprise Architecture Professionals, Forrester Research, Inc., pp. 1-9, May 2011.
Iwasaki, Yoji; Yamazaki, Fumimo, Publication Info: 32nd Asian Conference on Remote Sensing 2011, ACRS 2011 1: 550-555. Asian Association on Remote Sensing. (Dec. 1, 2011) (Year: 2011).
Kopp et al., "Full-scale testing of low-rise, residential buildings with realistic wind loads", 2012, 15 pages.
McKeown et al., "OpenFlow: Enabling Innovation in Campus Networks," pp. 1-6, Mar. 14, 2008.
Melnik, Sergey et al., "Dremel: Interactive Analysis of Web-Scale Datasets," 36th International Conference on Very Large Data Bases, Sep. 13-17, 2010, Singapore, Proceedings of the VLDB Endowment, vol. No. 1.
NYSE Technologies Website and Fact Sheet for Data Fabric 6.0 Aug. 2011, https://web.archive.org/web/20110823124532/http://nysetechnologies.nyx.com/data-technology/data-fabric-6-0.
Richardson, Alexis, "Introduction to RabbitMQ, An Open Source Message Broker That Just Works," Rabbit MQ, Open Source Enterprise Messaging, pp. 1-36, May 13, 2009.
Stefan Theußl, "Applied High Performance Computing Using R," Diploma Thesis, Univ. Prof, Dipl, Ing. Dr. Kurt Hornik, pp. 1-126, Sep. 27, 2007.
STIC search dated Jan. 4, 2019 (Year 2019).
Telematics Set the Stage the Improved Auto Claims Management by Sam Friedman (Oct. 10, 2012); 3 pages.
Wang, Guohul et al., "Programming Your Network at Run-time for Big Data Applications," IBM T.J. Watson Research Center, Rice University, HotSDN'12, Aug. 13, 2012, Helsinki, Finland.
Wang, Jianwu et al., "Kepler + Hadoop: A General Architecture Facilitating Data-Intensive Applications in Scientific Workflow Systems," WORKS 09, Nov. 15, 2009, Portland, Oregon, USA.
Webb, Kevin C. et al., "Topology Switching for Data Center Networks," Published in: Proceeding Hot-ICE'11 Proceedings of the 11th USENIX conference on Hot topics in management of Internet, cloud, and enterprise networks and services, Mar. 29, 2011.
Xi et al., "Enabling Flow-Based Routing Control in Data Center Networks using Probe and ECMP," Polytechnic Institute of New York University, IEE INFOCOM 2011, pp. 614-619.
Zevnik, Richard. The Complete Book of Insurance. Sphinx. 2004. pp. 76-78.
T. Sanidas et al., U.S. Appl. No. 61/800,561, filed Mar. 15, 2013, Specification, 29 pages.
U.S. Appl. No. 61/800,561, Sanidas et al., filed Mar. 15, 2013.
U.S. Appl. No. 61/866,779, Bergner, filed Aug. 16, 2013.
U.S. Appl. No. 61/926,091, Allen et al., filed Jan. 10, 2014.
U.S. Appl. No. 61/926,093, Allen et al., filed Jan. 10, 2014.
U.S. Appl. No. 61/926,095, Allen et al., filed Jan. 10, 2014.
U.S. Appl. No. 61/926,098, Allen et al., filed Jan. 10, 2014.
U.S. Appl. No. 61/926,103, Devereaux et al., filed Jan. 10, 2014.
U.S. Appl. No. 61/926,108, Allen et al., filed Jan. 10, 2014.
U.S. Appl. No. 61/926,111, Allen et al., filed Jan. 10, 2014.
U.S. Appl. No. 61/926,114, Devereaux et al., filed Jan. 10, 2014.
U.S. Appl. No. 61/926,118, Devereaux et al., filed Jan. 10, 2014.
U.S. Appl. No. 61/926,119, Devereaux et al., filed Jan. 10, 2014.
U.S. Appl. No. 61/926,121, Devereaux et al., filed Jan. 10, 2014.
U.S. Appl. No. 61/926,123, Devereaux et al., filed Jan. 10, 2014.
U.S. Appl. No. 61/926,532, Allen et al., filed Jan. 13, 2014.
U.S. Appl. No. 61/926,534, Allen et al., filed Jan. 13, 2014.
U.S. Appl. No. 61/926,536, Allen et al., filed Jan. 13, 2014.
U.S. Appl. No. 61/926,541, Allen et al., filed Jan. 13, 2014.
U.S. Appl. No. 61/943,897, Devereaux et al., filed Feb. 24, 2014.
U.S. Appl. No. 61/943,901, Devereaux et al., filed Feb. 24, 2014.
U.S. Appl. No. 61/943,906, Devereaux et al., filed Feb. 24, 2014.
U.S. Appl. No. 61/948,192, Davis et al., filed Mar. 5, 2014.
U.S. Appl. No. 62/311,491, Moy, filed Mar. 22, 2016.
U.S. Appl. No. 62/325,250, Rodgers et al., filed Apr. 20, 2016.
U.S. Appl. No. 62/351,427, Devereaux et al., filed Jun. 17, 2016.
U.S. Appl. No. 62/351,441, Flachsbart et al., filed Jun. 17, 2016.
U.S. Appl. No. 62/351,451, Chavez et al., filed Jun. 17, 2016.
U.S. Appl. No. 14/251,377, filed Apr. 11, 2014, Devereaux et al.
U.S. Appl. No. 14/251,392, filed Apr. 11, 2014, Allen et al.
U.S. Appl. No. 14/251,404, filed Apr. 11, 2014, Devereaux et al.
U.S. Appl. No. 14/251,411, filed Apr. 11, 2014, Allen et al.
U.S. Appl. No. 14/273,877, filed May 9, 2014, Allen et al.
U.S. Appl. No. 14/273,889, filed May 9, 2014, Devereaux et al.
U.S. Appl. No. 14/273,918, filed May 9, 2014, Allen et al.
U.S. Appl. No. 14/278,182, filed May 15, 2014, Allen et al.
U.S. Appl. No. 14/278,202, filed May 15, 2014, Allen et al.
U.S. Appl. No. 14/303,336, filed Jun. 12, 2014, Devereaux et al.
U.S. Appl. No. 14/303,347, filed Jun. 12, 2014, Devereaux et al.
U.S. Appl. No. 14/303,370, filed Jun. 12, 2014, Allen et al.
U.S. Appl. No. 14/303,382, filed Jun. 12, 2014, Allen et al.
U.S. Appl. No. 14/305,732, filed Jun. 16, 2014, Devereaux et al.
U.S. Appl. No. 14/324,534, filed Jul. 7, 2014, Devereaux et al.
U.S. Appl. No. 14/324,546, filed Jul. 7, 2014, Devereaux et al.
U.S. Appl. No. 14/324,609, filed Jul. 7, 2014, Devereaux et al.
U.S. Appl. No. 14/324,618, filed Jul. 7, 2014, Devereaux et al.
U.S. Appl. No. 14/324,748, filed Jul. 7, 2014, Devereaux et al.
U.S. Appl. No. 14/324,759, filed Jul. 7, 2014, Devereaux et al.

\* cited by examiner

US 10,783,588 B1

IDENTIFYING AND RECOMMENDING INSURANCE POLICY PRODUCTS/SERVICES USING INFORMATIC SENSOR DATA

CROSS REFERENCE TO RELATED APPLICATIONS

This application is a Continuation Application of U.S. patent application Ser. No. 14/251,411, filed Apr. 11, 2014, now U.S. Pat. No. 9,947,051, which claims priority to U.S. Provisional Patent Application Ser. Nos. 61/926,093 filed Jan. 10, 2014; 61/926,091 filed Jan. 10, 2014; 61/926,095 filed Jan. 10, 2014; 61/926,098 filed Jan. 10, 2014; 61/926,103 filed Jan. 10, 2014; 61/926,108 filed Jan. 10, 2014; 61/926,111 filed Jan. 10, 2014; 61/926,114 filed Jan. 10, 2014; 61/926,118 filed Jan. 10, 2014; 61/926,119 filed Jan. 10, 2014; 61/926,121 filed Jan. 10, 2014; 61/926,123 filed Jan. 10, 2014; 61/926,536 filed Jan. 13, 2014; 61/926,541 filed Jan. 13, 2014; 61/926,534 filed Jan. 13, 2014; 61/926,532 filed Jan. 13, 2014; 61/943,897 filed Feb. 24, 2014; 61/943,901 filed Feb. 24, 2014; 61/943,906 filed Feb. 24, 2014; and 61/948,192 filed Mar. 5, 2014, all of which are incorporated herein by reference in their entirety.

FIELD OF THE INVENTION

The disclosed embodiments generally relate to a method and computerized system for managing insurance and related products and services, and more particularly, to using data captured from a dwelling for identifying and recommending insurance policy products and/or services.

BACKGROUND OF THE INVENTION

Smart house functionality is a maturing space, but the opportunity for insurance companies remains largely untapped. Thus, the terms of insurance policies, such as homeowner insurance policies, may not be reflective of the true nature of the risks being insured.

Accordingly, there is an unmet need for measuring information relating to an insured risk, such as a residence or structures located on the residence premises, and utilizing that information to make appropriate modifications to insurance policy terms, such as the deductible amount.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a computer system and method are disclosed for processing insurance claim data to identify and recommend insurance policy modifications using informatic data from one or more informatic sensor devices relating to a dwelling. Analytical analysis is performed on the received informatic data to determine a dwelling assessment value regarding an insurance risk relating to the dwelling. Electronic data relating to an insurance policy associated with the dwelling is received by a computer processor and is electronically analyzed to determine insurance coverage and liability values for the dwelling as prescribed by the insurance policy. Predefined business rules are utilized by a computer processor using at least the dwelling assessment value and the determined insurance coverage and liability values for the dwelling to determine, and preferably recommend, one or more insurance products for inclusion with the insurance policy to mitigate insuree liability regarding the dwelling. Notification may then be provided regarding the determined and recommended one or more insurance products.

This summary section is provided to introduce a selection of concepts in a simplified form that are further described subsequently in the detailed description section. This summary section is not intended to identify key features or essential features of the claimed subject matter, nor is it intended to be used to limit the scope of the claimed subject matter.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
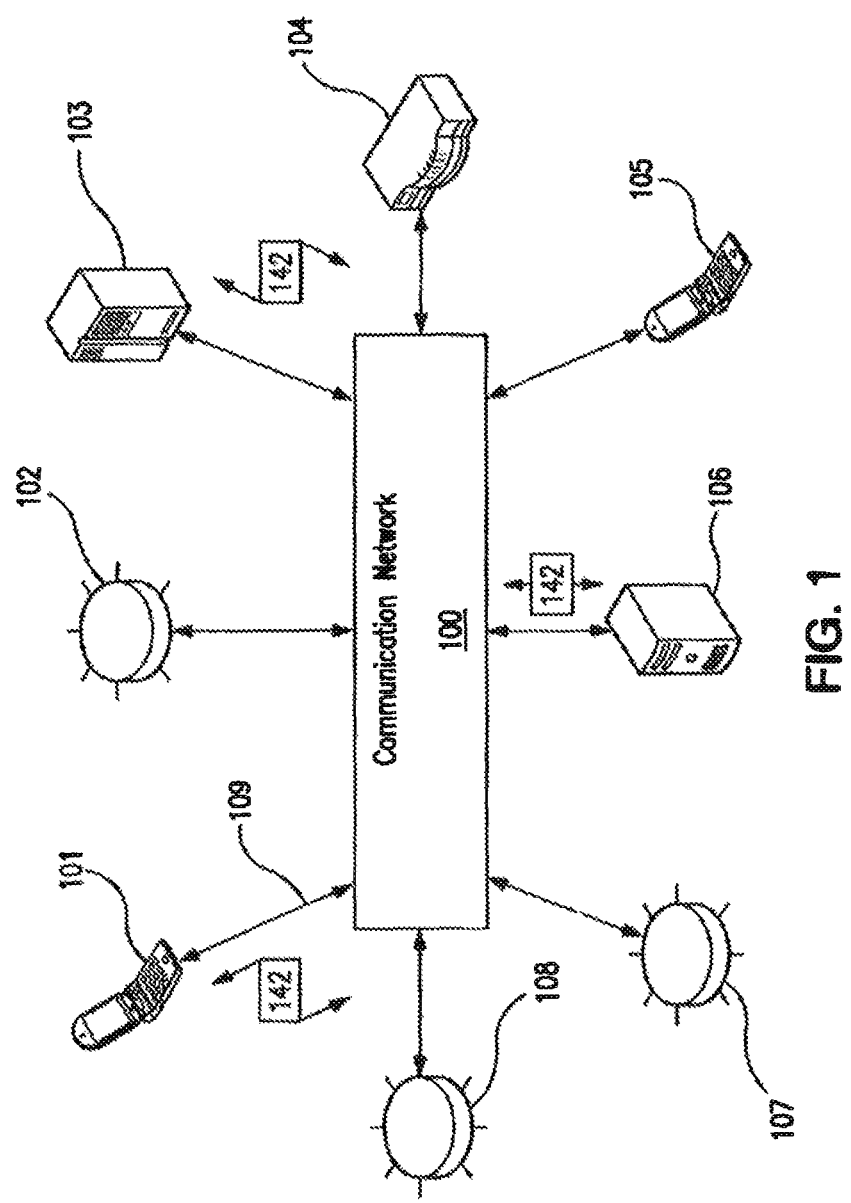
FIG. 1 illustrates an example communication network in accordance with an illustrated embodiment.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims. All publications and references cited herein are expressly incorporated herein by reference in their entirety. For instance, commonly assigned U.S. Pat. Nos. 8,289,160 and 8,400,299 are related to certain embodiments described here and are each incorporated herein by reference in their entirety.

As used herein, the term "risk related data" means data or information that may be relevant to an insurance company's decisions about underwriting, pricing, and other terms and conditions on which it is willing to issue insurance policies.

As used herein, the term "insurance" refers to a contract between an insurer, also known as an insurance company, and an insured, also known as a policyholder, in which the insurer agrees to indemnify the insured for specified losses, costs, or damage on specified terms and conditions in exchange of a certain premium amount paid by the insured. In a typical situation, when the insured suffers some loss for which he/she may have insurance the insured makes an insurance claim to request payment for the loss. It is to be appreciated for the purpose of the embodiments illustrated herein, the insurance policy is not to be understood to be limited to a residential or homeowners insurance policy, but can be for a commercial, umbrella, and other insurance policies known by those skilled in the art.

As used herein, the term "dwelling" means a building or structure in which one or more persons reside, including a single family home, duplex, apartment building or other multi-family structure, a mobile home, and/or a manufactured home.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a dwelling 300 or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, smart phone devices 105, servers 106, routers 107, switches 108 and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
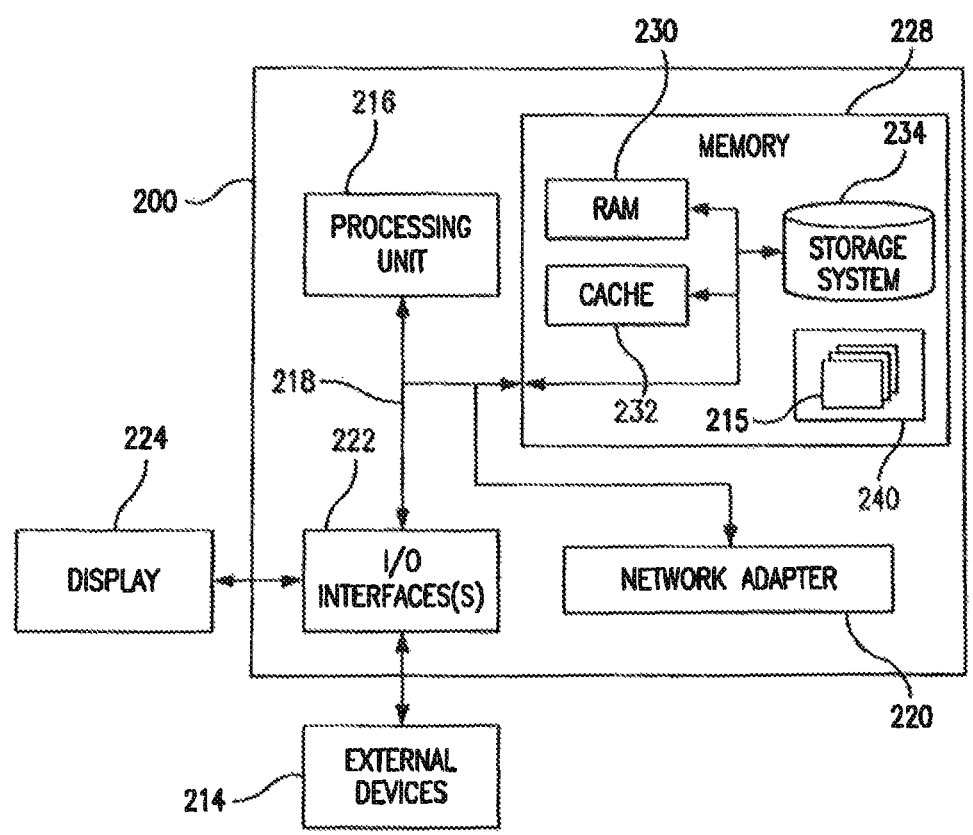
FIG. 2 illustrates a network computer device/node in accordance with an illustrated embodiment.

FIG. 2 is a schematic block diagram of an example network computing device 200 (e.g., one of network devices 101-108) that may be used (or components thereof) with one or more embodiments described herein, e.g., as one of the nodes shown in the network 100. As explained above, in different embodiments these various devices be configured to communicate with each other in any suitable way, such as, for example, via communication network 100.

Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as dwelling analyzer module 306 and policy analyzer module 308 described below, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3:
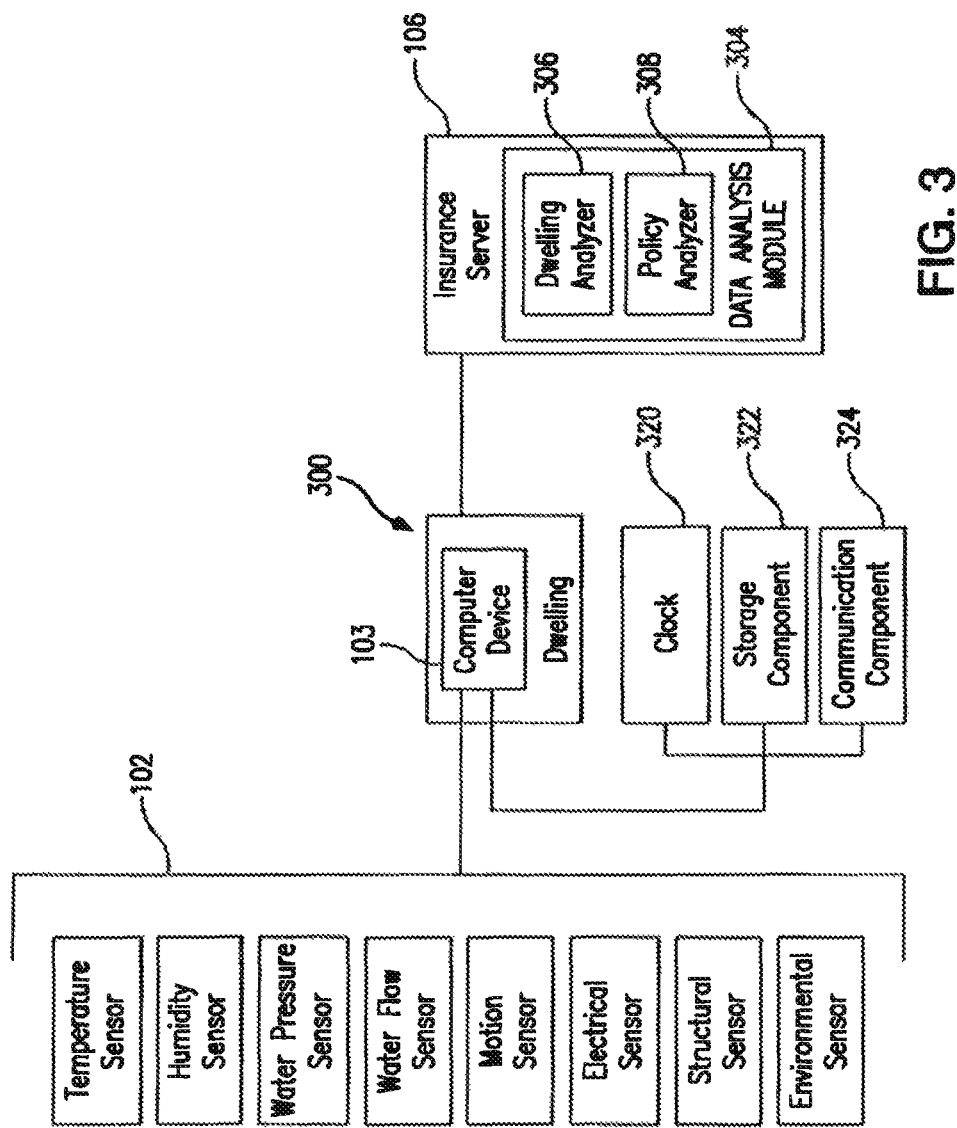
FIG. 3 is a block diagram of a dwelling from which sensor data is captured for subsequent analysis in accordance with an illustrated embodiment.

With the exemplary communication network 100 (FIG. 1) and computing device 200 (FIG. 2) being generally shown and discussed above, description of certain illustrated embodiments of the present invention will now be provided. With reference now to FIG. 3, an example of a dwelling 300 is shown which is to be understood to be any type of dwelling structure (e.g., residential, commercial, retail, municipal, etc.) in which the capture and analysis of sensor data (102) is useful for the reasons at least described below. Dwelling 300 preferably includes a computing device 103 for capturing data from a plurality of sensors 102 which capture data regarding various aspects of dwelling 300, as further described below. It is to be understood dwelling computing device 103 may be located in any location, and its position is not limited to the example shown.

Computing device 103 is preferably configured and operational to receive (capture) data from various sensors 102 regarding certain aspects (including functional and operational) of dwelling 300 (described further below) and transmit that captured data to a remote server 106, via network 100. It is noted device 103 may perform analytics regarding the captured sensor data regarding dwelling 300 and/or the remote server 106, preferably located or controlled by an insurance company/carrier, may perform such analytics, as also further described below. It is also to be understood in other embodiments, data from sensors 102 may be transmitted directly to remote server 106, via network 100, thus either obviating the need for dwelling computing device 103 or mitigating its functionality to capture all data from sensors 102.

In the illustrated embodiment of FIG. 3, dwelling computing device 103 is shown coupled to various below described sensor types 102. Although various sensor types 102 are described below and shown in FIG. 3, the sensor types described and shown herein are not intended to be exhaustive as embodiments of the present invention may encompass any type of known or unknown sensor type which facilitates the purposes and objectives of the certain illustrated embodiments described herein. Exemplary sensor types and their exemplary usages include (but are not limited to):

Temperature sensor—configured and operational to preferably detect the temperature present at the dwelling 300. For example, the temperature may rise and fall with the change of seasons and/or the time of day. A person may have a secondary home in a location that experiences low temperatures and is unoccupied for long stretches of time. The heater may malfunction and the temperature present at the dwelling 300 may go below an acceptable level. Moreover, in the event of a fire, the temperature present at the dwelling 300 may rise quickly—possibly to a level of extreme high heat. The temperature sensor may make use of probes placed at various locations in and around the dwelling 300, in order to collect a representative profile of the temperature present at the dwelling 300. Probes placed at various locations in and around the dwelling 300 are connected to device 103 by wire, or by wireless technology can send an alert to the person who owns the home or to the insurance company so that mitigation action can occur. These probes may be connected to device 103 by wire, or by a wireless technology. For example, if device 103 is positioned in the attic of the dwelling 300, the temperature may be higher than the general temperature present in the dwelling. Thus, probes placed at various locations (e.g., in the basement, on the various levels of a multi-level dwelling 300, in different rooms that receive different amounts of sun, etc.), in order to obtain an accurate picture of the temperature present at the dwelling. Moreover, device 103 may record both the indoor and outdoor temperature present at the dwelling 300. For example, data about the indoor temperature, the outdoor temperature, and/or the differential between indoor and outdoor temperatures, may be used as part of some analysis model, and thus all of the different values could be stored. Device 103 may store an abstract representation of temperature (e.g., the average indoor temperature, as collected at all of the probes), or may store each temperature reading individually so that the individual readings may be provided as input to an analysis model. An insurance company can also use the information collected from device 103 to send to the homeowner targeted advice on how to save energy based upon the temperature at the dwelling 300. For example, the energy sensor can determine that to hit a targeted energy use for the month the homeowner needs to set the temperature in the home at a different level. These devices can all work together to save the homeowner electricity use.

Humidity sensor—configured and operational to preferably detect the humidity present at the dwelling 300. Humidity sensor may comprise the humidity-detection hardware, or may employ one or more remote probes, which may be located inside and/or outside the dwelling 300. Humidity readings from one or more locations inside and/or outside the dwelling could thus be recorded by device 103. An example of this use of this sensor is that the humidity sensor 102 could detect that the humidity level in the home is over an acceptable range and send notice, either wired or wirelessly to device 103 so that the homeowner or insurance company can take an action. A homeowner may own an expensive art work or electronic equipment and need the humidity to stay at an acceptable range. The device 103 can determine that the humidity is over an acceptable range and send an alert to the homeowner or insurance company so that corrective action can occur.

Water Sensor(s)/Water pressure sensor(s)—configured and operational to preferably monitor water related conditions, including (but not limited to): the detection of water and water pressure detection, for instance in the plumbing system (including sewer lines, water lines, HVAC system, appliances, and automatic fire suppression systems) in the dwelling 300. With regards to a water pressure sensor, it may have one or more probes attached to various locations of the dwelling's 300 plumbing, and thus device 103 may record the pressure present in the plumbing, and/or any changes in that pressure. For example, plumbing systems may be designed to withstand a certain amount of pressure, and if the pressure rises above that amount, the plumbing system may be at risk for leaking, bursting, or other failure. An example of this is with a dishwasher. It could be known that a model of a dishwasher at dwelling 300 should have a water pressure of X. If the washing machine's water pressure is higher or lower than it is supposed to, device 103 will collect this information and could send an alert to the homeowner or insurance company so that mitigation action can take place. Thus, device 103 may record the water pressure (and water flow) that is present in the plumbing system at various points in time. An analysis model could use the information about water pressure in various ways such as rating the home insurance, tracking water pressure, and/or providing advice and guidance.

Water flow sensor—configured and operational to preferably monitor water flow rate in the plumbing system (including sewer lines, water lines, HVAC system, appliances, and automatic fire suppression systems) in the dwelling 300. Water flow sensor may have one or more probes attached to various locations of the dwelling's 300 plumbing, such as faucets, showerheads and appliances, and thus water flow sensor 103 may measure and/or record the amount of water flowing through the dwelling's 300 water supply system. Thus, device 103 may record the water flow that is present in the plumbing system at various points in time. An analysis model could use the information about water flow in various ways such as rating the home insurance, tracking water consumption, or providing advice and guidance. The readings of the amount of water used at dwelling 300 can be used to analyze and forecast an expected water bill. This can also be used for budgeting and finance management because a history of water usage at the dwelling 300 or certain appliances can be measured and displayed to the homeowner or insurance company. These readings and usage can be provided to the homeowner so that he can budget X amount of money each month for the water bill. Also, the homeowner or insurer can track water use and determine based upon the rate of energy consumption that the homeowner is on a pace to use more or less water use than is budgeted. If the homeowner is on pace to use more water than is budgeted the insurance company can provide advice and guidance on how the homeowner can reduce water use. If the homeowner is on pace to use less water than is budgeted the insurance company can help the homeowner in moving the unspent portion of the budget amount to a savings device like a CD or money market.

Leak detection sensor—configured and operational to preferably monitor the presence of leaks from gas and water plumbing pipes both inside and outside the walls of the dwelling 300. The leak detection sensor may have one or more probes attached to various locations of the dwelling's 300 plumbing and piping, and this device 103 may record the fact that there is a gas or water leak. An example of this is that a leak detection sensor can be placed behind the washing machine. If the hoses that connect the washing machine to the water line were to break the leak detection sensor would know that there was a water leak and notify the insured and/or the insurance company. The insured can also give prior authorization to the insurance company to act on their behalf to correct the water leak. For instance, call a plumber to turn off the water at the street when the leak detector activates and the insured does not respond to the leak detection sensor after a certain period of time. The leak detection sensors do not need to necessarily be placed around the appliance or pipe that they are intended to check for leaks. For example, an insured could place a sensor on the main water line that goes into the dwelling 300 and this sensor could know by changes in pressure, temperature, etc. that there is a later or gas leak in the dwelling 300—even if the leak was inside the walls and not viewable inside the home. An analysis model could use the information about how often the leak detection sensor alerts, whether the insured uses leak detection sensor(s), and where they are placed in various ways such as rating the home insurance, tracking water pressure, and/or providing advice and guidance.

Wind speed sensor—configured and operational to record the wind speed present at the dwelling 300. For example, one or more wind sensors may be placed outside the dwelling 300, at the wind speed and/or direction may be recorded at various points in time. Device 103 may record these wind speed and/or wind direction readings. The wind speed may be used by an analysis model for various purposes.

Motion sensor—configured and operational to sense motion in the dwelling 300 to which device 300 is attached. Typically, dwelling's 300 do not move significantly, except in the event of a catastrophe. Motion sensor may indicate that the dwelling 300 is sliding down a hill (e.g., in the event of an extreme flood or mudslide), or is experiencing a measurable earthquake. A motion sensor may further include earth sensors for detecting sink holes and earth movement. In addition, a motion sensor may be configured and operational to sense the motion of objects within the dwelling.

Electrical system sensor/analyzer configured and operational to assess the condition of the dwelling's 300 electrical system. For example, potentiometers may be connected to various points in the dwelling's 300 electrical system to measure voltage. Readings from the potentiometers could be used to determine if the voltage is persistently too high, or too low, or if the voltage frequently drops and/or spikes. Such conditions may suggest that the dwelling 300 is at risk for fire. Other types of electrical measurements could be taken, such as readings of current flowing through the electrical system. These readings could help determine if an appliance is at risk of failure and damage. For example, it could be known that a model of water heater at dwelling 300 consumes X amount of electricity. If the water heater starts consuming more electricity than it is supposed to device 103 will collect this information and could send an alert to the homeowner or insurance company so that mitigation action can take place. Still other types of electrical measurements could be determined include how energy is used and at what times of day it is used, etc. The readings of the amount of energy used at dwelling 300 can be used to analyze and forecast an expected energy bill. This can also be used for budgeting and finance management because a history of energy usage at the dwelling 300 or certain appliances can be measured and displayed to the homeowner or insurance company. These readings and usage can be provided to the homeowner so that he can budget X amount of money each month for the energy bill. Also, the homeowner or insurer can track energy use and determine based upon the rate of energy consumption that the homeowner is on a pace to use more or less energy use than is budgeted. If the homeowner is on pace to use more energy than is budgeted the insurance company can provide advice and guidance on how the homeowner can reduce energy use. If the homeowner is on pace to use less energy than is budgeted the insurance company can help the homeowner in moving the unspent portion of the budget amount to a savings device like a CD or money market. Any type of data about the dwelling's 300 electrical system could be captured by device 103. An analysis model could use the information about electrical energy in various ways such as rating the home insurance, tracking energy consumption, or providing advice and guidance.

Positional sensor configured and operational to record the position of device 103. For example, the positional sensor may be, or may comprise, a Global Positioning System (GPS) receiver, which may allow the position of device 103 to be determined. Or, as another example, positional sensor may use triangulation technology that communicates with fixed points (such as wireless communication towers) to determine its position. While a dwelling 300 normally does not move, positional sensor may allow device 103 to be recovered in the event of a catastrophe. For example, if a dwelling 300 explodes, or is otherwise catastrophically damaged, device 103 may be propelled to an unknown location. Positional sensor may indicate the geographical area of a dwelling 300 which an analysis model could use in various ways. Positional sensor may record the position of device 103, which device 103 could communicate to an external source, thereby allowing device 103 to be found. Another example of positional sensors is for the location, number, and use of the 102 sensors. The insurance company could provide different insurance rates, incentives for where the sensors are placed in the dwelling 300. The insurance company could also use the location of the 102 sensors to provide advice and guidance about how to reduce the chance of a homeowner loss or reduce energy/water use.

Structural sensor—configured and operational to preferably detect various structural conditions relating to dwelling 300. A structural sensor may comprise detection hardware, or may employ one or more remote probes, which may be located inside and/or outside the dwelling 300. Conditions recorded by structural sensor may include (but are not limited to) the condition of the wall structure, floor structure, ceiling structure and roof structure of dwelling 300, which may be achieved via: load bearing detectors; components which measure the slope of a floor/wall/ceiling; carpet conditions (e.g., via a nano sensor) or any other components functional to detect such conditions. Structural readings from one or more locations inside and/or outside the dwelling 300 could thus be recorded by device 103 and used by an analysis model in various ways.

Environmental Sensor—configured and operational to preferably detect various environmental conditions relating to dwelling 300. An environmental sensor may comprise detection hardware, or may employ one or more remote probes, which may be located inside and/or outside the dwelling 300. Conditions recorded by an environmental sensor may include (but are not limited to) the air quality present in dwelling 300, the presence of mold/bacteria/algae/lead paint or any contaminant adverse to human health (whether airborne or attached to a portion of the structure of dwelling 300). Such environmental readings from one or more locations inside and/or outside the dwelling 300 could thus be recorded by device 103 and used by an analysis model in various ways.

Appliance Sensor—configured and operational to preferably detect various operating parameters relating to appliances within a dwelling 300. Examples of appliances include (but are not limited to) all kitchen appliances (e.g., refrigerator, freezer, stove, cooktop, oven, grill, dishwasher, etc.); HVAC components (air conditioner, heating system, air handlers, humidifiers/de-humidifiers, etc.), water purification system, media entertainment system (e.g., televisions), networking components (routers, switches, extenders, etc.) electrical generator system, pool filtration and heating system, garage door openers, sump pump and water well system, septic tank system, garage door opener, etc. An appliance sensor may comprise detection hardware, or may employ one or more remote probes, which may be located inside and/or outside the dwelling 300 functional to detect certain operating parameters of appliances. Operating parameters detected by an appliance sensor 300 may include (but are not limited to): the operating efficiency of an appliance (energy usage, output performance); the time an appliance operates, the age of an appliance; maintenance needs of an appliance (e.g., change a filter component or schedule a periodic examination/tune-up); and repair needs of an appliance (which may also include the identification of parts needed). An example of this is with a dishwasher. It could be know that a model of a dishwasher at dwelling 300 should use X amount of water per minute when in use. If the washing machine's water use is higher or lower than it is supposed to, device 103 will collect this information and could send an alert to the homeowner or insurance company so that mitigation action can take place. Such appliance readings from one or more dwelling appliances could thus be recorded by device 103 and used by an analysis model in various ways.

Image Sensor—configured and operational to obtain image information of the subject within a dwelling 300. Examples of image sensors include (but are not limited to) visible light cameras, infrared cameras, two-dimensional (2D) cameras, three-dimensional (3D) cameras, thermal image cameras, radar-capable sensors, sensors that detect other wavelengths, and/or any combination thereof.

With exemplary sensors 102 identified and briefly described above, and as will be further discussed below, it is to be generally understood sensors 102 preferably record certain data parameters relating to products and services provided by an insurance carrier, such as USAA, to determine insurance policy modifications and other value added services such as those described below. It is to be understood and appreciated the aforementioned sensors 102 may be configured as wired and wireless types integrated in a networked environment (e.g., WAN, LAN, WiFi, 802.11X, 3G, LTE, etc.), which may also have an associated IP address. It is to be further appreciated the sensors 102 may consist of internal sensors located within the structure of dwelling 300; external sensors located external of the structure of dwelling 300; sound sensors for detecting ambient noise (e.g., for detecting termite and rodent activity, glass breakage, intruders, etc.); camera sensors such as those consisting of camera standalone devices, or by integrating into existing camera devices in a dwelling 300. It is additionally to be understood and appreciated that sensors 102 can be networked into a central computer hub (e.g., device 103) in a dwelling to aggregate collected sensor data packets. Aggregated data packets can be analyzed in either a dwelling computer system (e.g., device 103) or via an external computer environment (e.g., server 106). Additionally, it is to be understood data packets collected from sensors 102 can be aggregated in dwelling computing device 103 and send as an aggregated packet to server 106 for subsequent analysis whereby data packets may be transmitted at prescribed time intervals (e.g., a benefit is to reduce cellular charges in that some dwellings 300 may not have Internet access or cellular service is backup when dwelling Internet service is nonfunctioning).

In accordance with an illustrated embodiment, in addition to the aforementioned, the sensors 102 being utilized relative to dwelling 300, dwelling computing device 103 may additionally be coupled to a Clock 320 which may keep track of time for device 103, thereby allowing a given item of data to be associated with the time at which the data was captured. For example, device 103 may recurrently capture readings of temperature, wind speed, humidity, appliance operating times, etc., and may timestamp each reading. The time at which the readings are taken may be used to reconstruct events or for other analytic purposes, such as those described below. For example, the timestamps on wind speed readings taken during a hurricane may allow it to be determined, after the hurricane has occurred, how quickly the wind speed rose in the vicinity of the dwelling 300.

A storage component 322 may further be provided and utilized to store data readings and/or timestamps in device 103. For example, storage component 322 may comprise, or may otherwise make use of, magnetic or optical disks, volatile random-access memory, non-volatile random-access memory, or any other type of storage device. There may be sufficient data storage capacity to store several hours or several days worth of readings. For example, the severe part of a hurricane might last for half a day, a full day, or several days. Storage component 322 might have sufficient storage capacity to allow twelve or more hours of readings to be stored, thereby allowing forensic reconstruction of how the hurricane affected the dwelling 300 during the full time that the dwelling 300 was experiencing the hurricane's impact.

A communication component 324 may further be provided and utilized to communicate recorded information from dwelling computing device 103 to an external location, such as computer server 106, which may be associated with an insurance carrier such as USAA. Communication component 324 may be, or may comprise, a network communication card such as an Ethernet card, a WiFi card, or any other communication mechanism. However, communication component 324 could take any form and is not limited to these examples. Communication component 324 might encrypt data that it communicates, in order to protect the security and/or privacy of the data. Communication component 324 may communicate data recorded by device 103 (e.g., data stored in storage component 322) to an external location, such as server 106. For example, server 106 may be operated by an insurance company, and may collect data from dwelling computing device 103 to learn about risks and needs and other analytics relative to dwelling 300 in which device 103 is located. Communication component 324 may initiate communication sessions with server 106. Or, as another example, server 106 may contact device 103, through communication component 324, in order to receive data that has been stored by device 103. Additionally, data from sensors 102, clock 320 and/or storage component 322 may be communicated directly to server 106, via network 100, thus obviating or mitigating the need for dwelling computing device 103.

In the example of FIG. 3, communication component 324 (which is shown, in FIG. 3, as being part of, or used by, dwelling computing device 103) communicates data to server 106. Server 106 may comprise, or otherwise may cooperate with, a data analysis module 304, which may analyze data in some manner. Data analysis module 304 may comprise various types of sub-modules, such as dwelling analyzer 306 and policy analyzer 308. In general, dwelling analyzer 306 may perform an analysis of collected data regarding various attributes of dwelling 300, such as, for example, but not limited to, structural condition of the dwelling 300 and environmental conditions detected in the vicinity of the dwelling 300. Policy analyzer 308 may perform an analysis of an insurance policy associated with the dwelling 300 in order to identify and recommend insurance policy products/services, as described below in connection with FIG. 5.

Dwelling analyzer 306 may further include be configured and operational to send command signals to sensors 102. Such command signals may be sent through dwelling computing device 300, or such commands may be sent directly to sensors 102. Such command signals may include, for exemplary purposes only and without limitation, an instruction to take an immediate reading, an instruction to take a series of readings (e.g., every five minutes for one hour, every minute for one week), an instruction to take more frequent readings (e.g., every hour rather than every six hours), an instruction to take less frequent readings (e.g, every day rather than every hour), and/or any permutations or derivations thereof as will be known by those skilled in the art.

Figure 4:
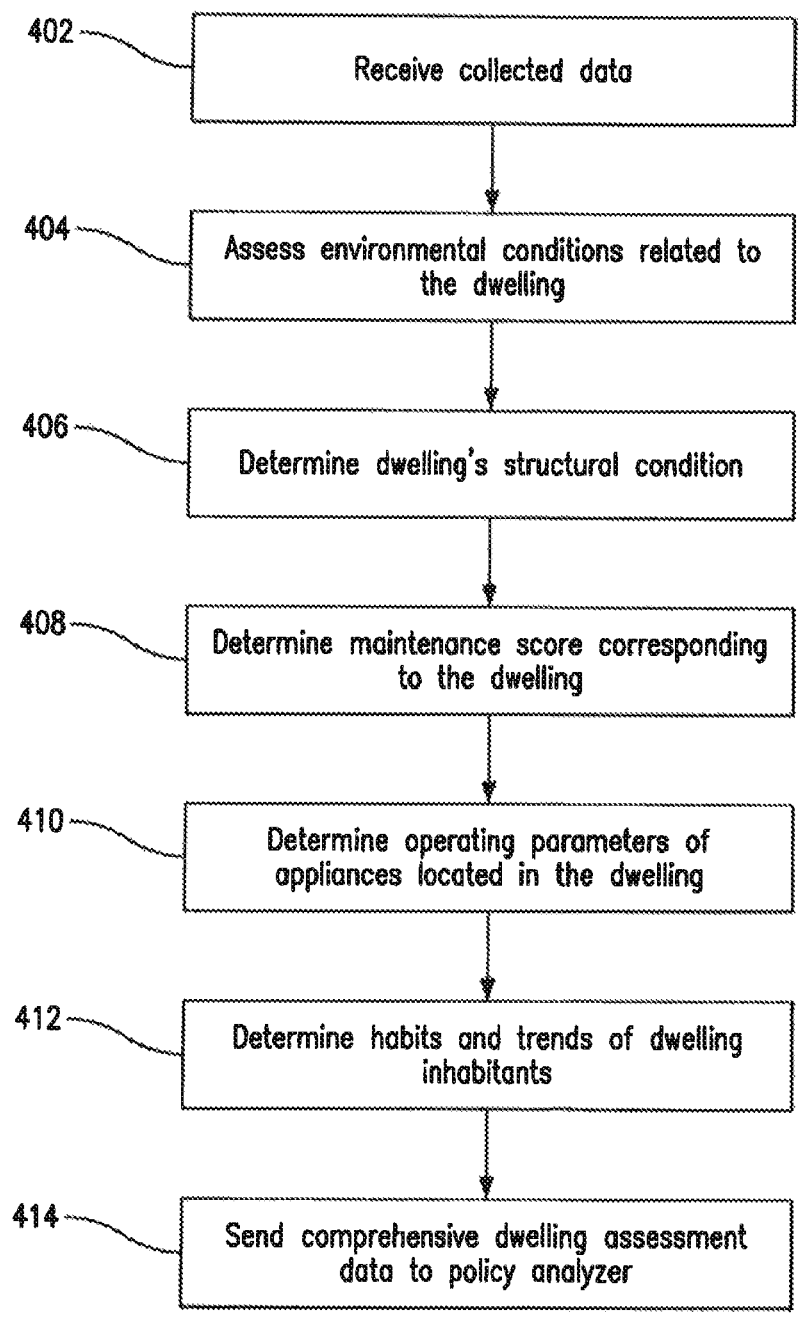
FIG. 4 is a flow diagram of operational steps of the dwelling analyzer module of FIG. 3 in accordance with an illustrated embodiment.
Figure 5:
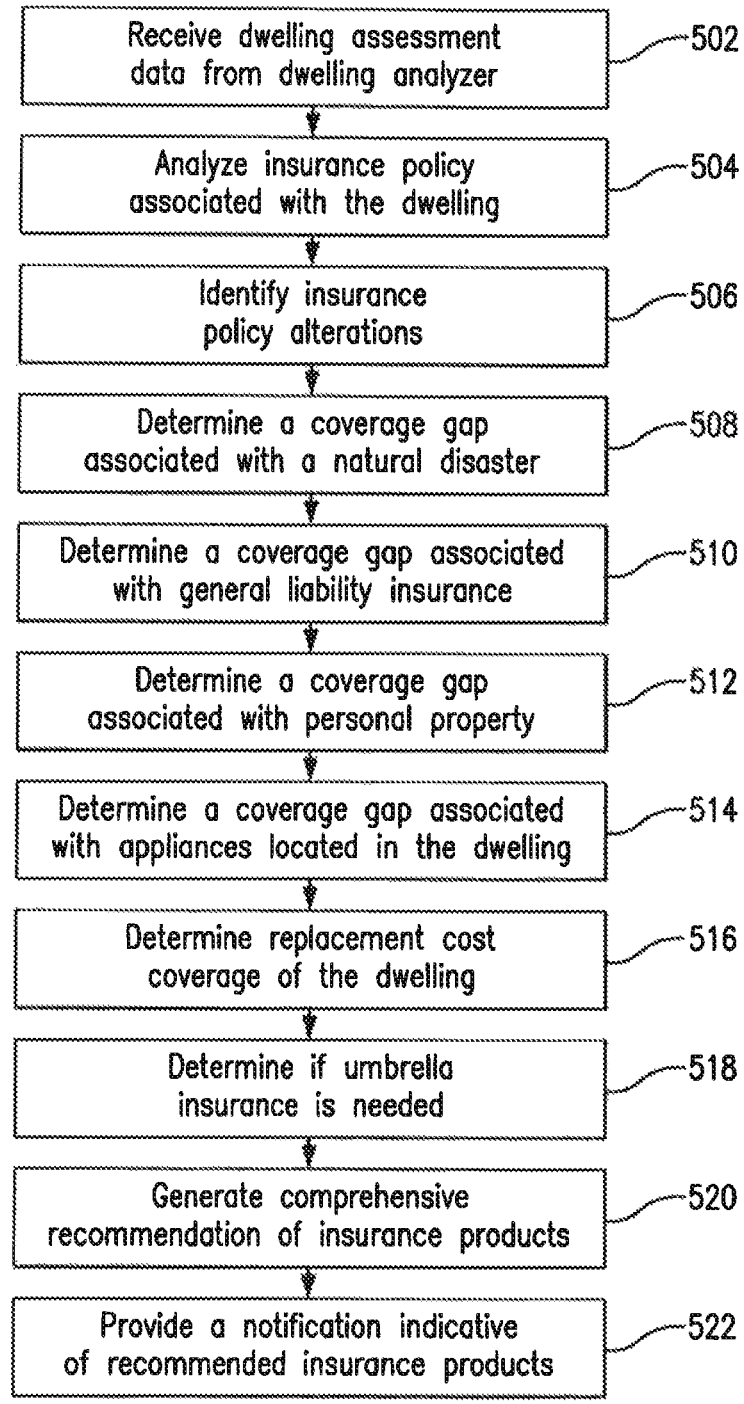
FIG. 5 is a flow diagram of operational steps of the policy analyzer module of FIG. 3 in accordance with an illustrated embodiment.

FIGS. 4 and 5 show, in the form of a flow chart, exemplary operational steps of the dwelling analyzer 306 and policy analyzer 308, respectively. Before turning to descriptions of FIGS. 4 and 5, it is noted that the flow diagram shown therein are described, by way of example, with reference to components shown in FIGS. 1-3, although these operational steps may be carried out in any system and are not limited to the scenario shown in the aforementioned figures. Additionally, the flow diagrams in FIGS. 4 and 5 show an example in which operational steps are carried out in a particular order, as indicated by the lines connecting the blocks, but the various steps shown in these diagrams can be performed in any order, or in any combination or sub-combination.

With reference to FIG. 4, at 402, dwelling analyzer 306 preferably collects informatic data from one or more informatic sensors 102 relating to dwelling 300. In an embodiment of the present invention, this step may involve computing device 103 periodically contacting (via network 100), at prescribed time intervals, data analyzer component 304 running on server 106 to send accumulated data. In an alternative embodiment, contact between the dwelling computing device 103 and dwelling analyzer 306 may be initiated when the dwelling analyzer 306 contacts the dwelling computing device 103. Following the initial contact, dwelling analyzer 306 may receive data from the dwelling computing device 103. It is to be understood data packets collected from sensors 102 can be aggregated in dwelling computing device 103 and sent as an aggregated packet to dwelling analyzer 306 for subsequent analysis. As mentioned below in each of illustrative steps 404 to 412, dwelling analyzer 306 is preferably configured and operational to perform analytical analysis on the aforementioned received informatic data to determine a dwelling assessment value preferably regarding dwelling 300, which dwelling assessment value may identify one or more insurance risks associated with the dwelling 300 (e.g., steps 404 to 412).

At 404, dwelling analyzer 306 preferably processes the informatics data collected by a plurality of sensors 102 to assess environmental conditions related to the dwelling 300. Environmental conditions may include, but are not limited to: temperature conditions, wind conditions, air quality present in the dwelling 300, humidity present in the dwelling 300, and so forth. In various embodiments of the present invention, the plurality of sensors 102 measuring and/or collecting environmental informatics data may include one or more of temperature sensors, humidity sensors, sound sensors, wind speed sensors, environmental sensors, and so on. In an embodiment of the present invention, dwelling analyzer 306 may collect data from more than one dwelling in a geographic area to determine the general level of risk in the area. For example, dwelling analyzer 306 may analyze the data from approximately ten houses in a particular geographic location to determine that average wind speed has been increasing over the past few years. As another example, dwelling analyzer 306 may determine whether a particular geographic area in which the dwelling 300 is located is prone to earthquakes based on recent seismic activity measured by various environmental sensors 102. This information may be used by policy analyzer 308, for instance, to determine proper insurance coverage modifications.

At 406, based on data collected from sensors 102 regarding dwelling 300, dwelling analyzer 306 preferably conducts an analysis to determine a structural condition of the dwelling 300. For example, dwelling analyzer 306 may determine whether harsh environmental conditions, such as hurricane, storm surge, earthquake, volcano, landslide, and the like, have affected structural integrity of the dwelling 300. In addition to the above, some geographic regions commonly experience problems that cannot only be a nuisance to those living in the residence, but which can also destroy the structural integrity of the dwelling structure itself. For example, termites are just one type of insect that are known to infest and damage homes. Thus, dwelling analyzer 306 may conduct an analysis to detect dangerous insect infestations within the dwelling 300 structure. As yet another non-limiting example, in this step dwelling analyzer 306 may detect a hole in the roof of the dwelling 300 requiring immediate repair. In general, at 406, dwelling analyzer 306 may analyze the collected data to determine whether dwelling 300 and/or any of its components satisfy structural soundness requirements.

At 408, dwelling analyzer 306 conducts an analysis to determine a maintenance score value corresponding to the dwelling 300. For example, dwelling analyzer 306 may generate the maintenance score value based upon the dwelling age, dwelling type and any repair and/or maintenance needs identified at 404 and 406. It is noted that repair/maintenance needs may include, but not limited to, immediate repair needs and preventive maintenance needs. In general, any dwelling condition that affects the residents' health or safety may be considered by dwelling analyzer 306 as requiring an immediate repair. For instance a hole may have been detected in the roof of dwelling 300 (via one or more sensors 102), requiring immediate repair. As another example, an environmental sensor may have detected a gas leak or any contaminant adverse to human health. As an example of preventive maintenance needs, based upon an air flow analysis, dwelling analyzer 306 may have detected that damaged frames and/or dividers allow air leaks into dwelling 300. Thus, dwelling analyzer 306 may consider window replacement as a preventive maintenance factor in calculation of the maintenance score value. The generated maintenance score may be represented in the form of a numerical value, such as a value ranging from 0 to 5 for each of the factors, as well as a combined (average or weighted average) aggregate score.

Dwelling 300 may contain a plurality of appliances located therein or in its vicinity. Accordingly, at 410, dwelling analyzer 306 preferably performs an analysis of data collected from such appliances, such as their age, operating parameters, maintenance/repair issues, and the like. This step may further involve analyzing environmental conditions in which appliances operate. For example, dwelling analyzer 306 may use environmental data measured with a plurality of sensors 102 situated at or near the analyzed appliances. The environmental data may be indicative of temperature, humidity, pressure, averages of the foregoing measurements over a time period, etc. More specifically, dwelling analyzer 306 may be configured to identify maintenance/repair issues based upon environmental conditions in conjunction with operating parameters. In addition, dwelling analyzer 306 may detect performance degradation of an appliance (e.g., refrigerator) upon either it's past operating performance efficiency and/or its operating performance falling outside of threshold values prescribed for it by a manufacturer. As another non-limiting example, dwelling analyzer 306 may detect a dirty filter in another appliance (e.g., HVAC component) and/or may detect degradation in HVAC component performance likely contributable to a dirty filter element.

Next, at 412, dwelling analyzer 306 preferably determines habits and trends of dwelling 300 inhabitants based on collected informatics sensor data. In an embodiment of the present invention, one or more appliance sensors 102 may be employed to measure the use of cooking appliances such as a kettle, a fridge, a washing machine, a microwave oven or an electric cooker. For example, dwelling analyzer 306 may detect the cooking time trends by detecting that a rice cooker or microwave oven is turned on/off, detecting that a gas range or an IH (Induction-Heating) cooking heater is turned on/off or detecting other cooking home electric appliances are turned on/off. As another example, dwelling analyzer 306 may combine data collected from various types of sensors, such as motion and appliance sensors 102, to determine, for instance, whether any of the cooking appliances remain unattended for an extended period of time, thus increasing the risk of fire. The daily cooking activity tracking may be adaptive. In other words, dwelling analyzer 306 preferably gradually adjusts to the dwelling inhabitant's new activities and/or habits if they change over time. As another non-limiting example, dwelling analyzer 306 may flag certain determined water consumption and/or energy consumption patterns of dwelling inhabitants as hazardous. In general, dwelling analyzer 306 may assess the risk of fires, flooding, explosions and theft of personal property, amongst other risks, arising from various activities of dwelling inhabitants and/or events observed at the dwelling 300.

Thus, in steps 402-412, dwelling analyzer 306 analyzes various conditions that are present at the dwelling 300, in advance of any actual damage event. At 414, dwelling analyzer 306 preferably transmits this comprehensive dwelling 300 assessment to policy analyzer module 308. In an embodiment of the present invention, the comprehensive assessment data may include, but not limited to, dwelling's structural condition, maintenance score value, risky habits and trends of dwelling inhabitants, environmental conditions related to the dwelling 300, and the like. In an alternative embodiment, dwelling analyzer 306 may store this information in insurance server's 106 storage component.

FIG. 5 is a flow diagram of operational steps of the policy analyzer module of FIG. 3 in accordance with an illustrated embodiment. At 502, policy analyzer 308 preferably receives dwelling 300 assessment information from the dwelling analyzer 306. In an alternative embodiment of the present invention, this step may involve the policy analyzer 308 retrieving such information from the insurance server's 106 storage component. Next, policy analyzer 308 preferably maps the received/retrieved data to a particular insurance policy associated with the dwelling 300.

At 504, policy analyzer 308 preferably receives electronic data relating the mapped insurance policy (step 502) and electronically analyzes the insurance policy electronic data associated with the dwelling 300 to further assess perceived dwelling exposure (e.g., analyze the insurance policy to determine prescribed insurance coverage and liability value for the dwelling 300). For example, policy analyzer 308 may identify the type of the insurance policy and may identify one or more perils covered by the policy. As used herein, the term "peril" refers to a cause of loss. By way of example, such perils (or perilous events) may include a natural disaster (e.g., a tornado, a hurricane, an earthquake, a flood, etc.), a manmade disaster (e.g. a release of hazardous material, gas pipe explosion, arson, etc.), and the like. Coverage can be provided on an "all perils" basis, or a "named perils" basis. Named perils policies typically list exactly what is covered by the policy, while open perils (or all perils) policies may list what is excluded from coverage. Thus, in an embodiment of the present invention, policy analyzer 308 may identify perils and/or other risks excluded from coverage.

At 506, policy analyzer 308 preferably identifies one or more policy modifications based on the analysis conducted at 504 and based on dwelling assessment information received from the dwelling analyzer 306. Such policy modifications may include, but are not limited to, policy discount modifications, adjustments to coverage limits, premium adjustments, and the like. For example, discount on the insurance policy for the dwelling 300 may be provided based on the decision of an owner/operator of the dwelling to share data from sensors 102 with an insurance carrier (e.g., insurance carrier server 106). Maintaining (or providing adjustments to) the policy discount may be contingent upon the adherence of certain conditions, such as maintenance of the dwelling structure, as determined by the dwelling analyzer 306 based on data captured from the dwelling sensors 102. Advantageously, the analysis performed by the policy analyzer 308 may account for dwelling inhabitants' habits and trends. For example, fires are most often caused by owners' and residents' bad habits, common mistakes, or negligence. Therefore, if dwelling analyzer 306 determines that the cooking appliances remain unattended in the dwelling 300 for an extended period of time frequently, thus increasing the risk of fire, policy analyzer 308 may increase policy premiums accordingly. It is to be appreciated, and as further explained below, policy analyzer 308 preferably utilizes predefined business rules using at least a dwelling assessment (e.g., steps 404 to 412) and determined insurance coverage and liability values (e.g., step 504) for an insurance policy relating to the dwelling 300 to determine one or more insurance products for inclusion with the insurance policy to mitigate insuree liability regarding the dwelling 300.

At 508, policy analyzer 308 preferably determines a coverage gap associated with a natural disaster, such as, for example, but not limited to, an earthquake, hurricane, tornado, typhoon, flood, fire, and the like. In an embodiment of the present invention, once policy analyzer 308 identifies all perils covered by the insurance policy, it preferably evaluates levels of exposure for each peril based on observed and/or historical data provided by the dwelling analyzer 306. As an illustrative example, policy analyzer 308 may determine estimated likelihood that a specified peril (e.g., a tornado) may occur in a geographical zone corresponding to dwelling's 300 location, based on environmental conditions (i.e., wind speed measurements) analyzed by the dwelling analyzer 306. In an embodiment of the present invention, policy analyzer 308 may perform evaluation of the probable maximum loss ("PML") corresponding to the dwelling 300. Determining the PML for a property is conventionally treated as an evaluation of the costs likely to be incurred in response to a particular loss event. In addition, policy analyzer 308 may determine whether any additional coverage (not covered by the current policy) may be provided. For example, homeowners policies generally exclude most or all damage to the property from flood (including hurricane storm surge), earth movement (due to settling, shrinking, expansion, earthquake, volcano and landslide), pollution, war, and nuclear accidents. As another example, if policy analyzer 308 determines that estimated likelihood of earthquake occurrence is sufficiently high, in response, policy analyzer 308 may recommend earthquake coverage, for example, as a separate insurance policy. It is noted that policy analyzer 308 may provide similar recommendations with respect to other natural disasters based on the analysis performed by the dwelling analyzer 306. In various embodiments of the present invention, policy analyzer 308, may consider dwelling assessment attributes provided by the dwelling analyzer 306, such as the age of the dwelling, maintenance score value, risky habits and trends of dwelling inhabitants, environmental conditions related to the dwelling, the presence of sprinkler systems, and the like, to reduce or increase coverage limits.

At 510, policy analyzer 308 preferably determines a coverage gap associated with general liability insurance. Liability section of the insurance policy typically provides coverage in the event a dwelling inhabitant/operator is legally responsible for injury to others. It is noted that homeowner's policies typically have a variety of liability exclusions. For example, the homeowner's policy may exclude coverage for injuries to any tenants when more than two of them reside in the covered dwelling. So, if dwelling analyzer 306 determines that three upstairs bedrooms in the dwelling 300 are rented, policy analyzer 308 may recommend, for instance, a commercial policy for rooming houses. As another non-limiting example, if dwelling analyzer 306 determines that a pet (i.e., a dog) resides with one of the tenants in the dwelling 300, the current insurance policy may not cover the landlord of the dwelling 300 for tenant's dog biting someone on the dwelling premises. As a result, the landlord may be held responsible for the injuries. Thus, policy analyzer 308 may recommend to increase general liability coverage to provide additional protection for the policy holder (i.e., landlord).

Next, at 512, policy analyzer 308 optionally determines a coverage gap associated with personal property. Personal property coverage typically pays for a loss of policy holder's personal possessions, such as clothing, furniture, TV, stereo and other unattached personal items. In an embodiment of the present invention, policy analyzer 308 may evaluate current policy to determine if additional coverage for higher valued items may be needed. For instance, a homeowners insurance policy normally provides limited coverage for collectibles, jewelry, furs, and the like. Thus, policy analyzer 308 may recommend an additional insurance product, such as, for example, a personal property floater. A personal property floater may itemize each item, describe the item insured, and list excluded perils. A personal property floater normally provides coverage that is broader than the coverage in standard homeowners insurance policy. Thus, in this step, policy analyzer 308 may evaluate policy holder's risk in this area, based on the dwelling assessment attributes provided by dwelling analyzer 306, and may recommend a diversity of insurance products that may address such risk.

As previously noted, dwelling 300 may contain a plurality of appliances located therein or in its vicinity. Some of the risks involving appliances may be covered under a homeowner's policy associated with the dwelling 300, while other risks may not be covered. For instance, normal wear and tear to appliances typically is not covered under a homeowner's insurance policy. At 514, policy analyzer 308 may analyze maintenance/repair issues identified by dwelling analyzer 306, in order to recommend an insurance product that may provide adequate protection for the homeowner. For example, policy analyzer 308 may recommend an appliance breakdown coverage or home warranty insurance plans. These plans typically cover the gap left by homeowner's insurance. A list of appliances that may be covered by the appliance breakdown coverage plan includes, but is not limited to, washers and dryers, computers, dishwashers, refrigerators and freezers, ovens and microwaves, garbage disposals, heat pumps, heating and air conditioning systems, electrical service panels, home security systems, water heaters, well water pumps, sump pumps, surround sound systems, swimming pool equipment, televisions, and the like. As a non-limiting example, if dwelling analyzer 306 detects a surge in electric power that may damage one or more appliances in the dwelling 300, in response, policy analyzer 308 may recommend an insurance product that would provide breakdown coverage for such appliances.

At 516, policy analyzer 308 preferably determines replacement cost for the dwelling 300 and/or personal property located therein. In an embodiment of the present invention, this step may involve policy analyzer 308 determining the PML in relation to a particular loss event. For example, this valuation may be determined as the replacement cost of restoring the dwelling 300 in the event of a flood or rebuilding a structure following a fire. Accordingly, policy analyzer 308 may recommend an adjustment to the current policy. For example, replacement cost estimates may be influenced by supply of labor, demand for labor, and the cost of construction materials. Thus, policy analyzer 308 may recommend to change the coverage amount to maintain coverage at least equal to 100 percent of the estimated replacement cost coverage for the dwelling 300.

At 518, policy analyzer 308 optionally determines a need for an umbrella insurance policy. Umbrella insurance refers to an insurance policy that protects the assets and future income of the policyholder above and beyond the standard limits set on their primary (i.e., underlying) insurance policies. Typically, an umbrella policy is pure liability coverage over and above the coverage afforded by the underlying policy. The term "umbrella" is used because it covers liability claims from all policies underneath it. For example, if a policyholder has a homeowner's policy with a limit of $300,000 and an earthquake policy with a limit of $500,000, then with a million dollar umbrella insurance policy, policyholder's combined limits become in effect, i.e. $1,300,000 on a homeowners liability claim and $1,500,000 on an earthquake claim. Umbrella insurance may also provide coverage for claims that may be excluded by the primary policies. Thus, instead of recommending to increase general liability coverage, as discussed above in connection with step 510, at 518 policy analyzer 308 may recommend an umbrella insurance policy. If at 504 policy analyzer determines that the dwelling 300 is already covered by an umbrella insurance policy, at 518 policy analyzer 308 may automatically determine whether an adjustment is needed to the dwelling's current umbrella policy, for example, in view of the suggested changes to the underlying homeowner's insurance policy. For instance, if the policy analyzer 308 recommends (e.g., at 514) to add one or more appliances to the underlying insurance policy or policies, then additional umbrella coverage may be needed based on that additional appliance added to the policy. In addition, policy analyzer 308 may determine that an adjustment is needed to the current umbrella policy in view of the hazardous habits of dwelling occupants, which may have been detected by the dwelling analyzer 306.

At 520, policy analyzer 308 preferably automatically generates a comprehensive set of insurance products recommendations based on the analysis performed at steps 504-518. In an embodiment of the present invention, policy analyzer 308 may be configured to generate a predetermined number of insurance product recommendations based, for example, on correlation degrees of various insurance products associated with the dwelling 300. In addition, policy analyzer 308 may determine a multiple policy discount value, which can apply to combinations of multiple insurance policies.

At 522, policy analyzer 308 preferably provides a notification indicating suggested insurance product recommendations. It is to be appreciated that policy analyzer 308 may be configured to electronically deliver all notifications regarding recommended insurance products or services. The notification can be anything that advises a policy holder, device, or computer system of the suggested changes, including but not limited to, a display of text on a local display screen, a message in an email sent to a local or remote computer, a text message, a communication to a remote computer system. It is to be also understood and appreciated that policy analyzer 308 may be configured and operational to integrate with policy holder's communicative computing devices (e.g., smart phones (via an app), computers, tablets, smart TV's, vehicle communication systems, kitchen communication systems, etc.) for sending such notifications regarding insurance product recommendations. In an embodiment of the present invention, each notification may include, but not limited to, adjusted coverage limits and premiums, coverage adjustments, additional insurance products and services, and the like. Additionally, policy analyzer 308 may save the aforementioned recommendations in the insurance server's 106 storage component. These recommendations may then be automatically communicated to the policy holder and/or reflected in the policy holder's next insurance billing statement.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. For example, although the techniques are described above in the context of providing coverage for various items (such as personal property items), similar techniques may be used in the context of other types of property coverage or other types of insurance-related coverage. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A system for processing electronic data, comprising:
a database configured to store at least one insurance dataset corresponding to a dwelling, the at least one insurance dataset comprising one or more data records corresponding to one or more insurance coverages of one or more attributes of the dwelling;
a plurality of electronic sensor devices associated with the dwelling configured to capture data relating to the dwelling and to electronically transmit captured data, the plurality of electronic sensor devices comprising at least a motion sensor configured to collect data associated with structural movement of the dwelling; and
a server communicatively coupled with the database and each electronic sensor device within the plurality of electronic sensor devices, the server programmed to:
generate an instruction configured to receive data associated with the structural movement of the dwelling;
transmit the instruction to the motion sensor, the instruction configured to initiate a data capture by the motion sensor;
determine a structural susceptibility value based on the data received from the motion sensor;
retrieve the at least one insurance dataset corresponding to the dwelling;
determine whether the at least one insurance dataset comprises at least one data record corresponding to the structural susceptibility value; and
transmit an electronic message configured to notify an electronic device associated with the dwelling, the electronic message comprising the structural susceptibility value and at least one corresponding insurance dataset excluded from the one or more insurance coverages.

2. The system as recited in claim 1, wherein the electronic device associated with the dwelling is an electronic sensor device.

3. The system as recited in claim 1, wherein the plurality of electronic sensor devices further comprises electronic sensor devices to detect at least one of temperature, humidity, water, leak, wind speed, motion, electrical, positional, structural, environmental, appliance and image.

4. The system as recited in claim 1, wherein the electronic device associated with the dwelling is a mobile device associated with the dwelling.

5. The system as recited in claim 1, wherein the at least one insurance dataset excluded from the one or more insurance coverages corresponds to a coverage gap.

6. The system as recited in claim 1, wherein the plurality of electronic sensor devices further comprises an appliance sensor.

7. The system as recited in claim 6, wherein the server is further configured to:
generate a second instruction configured to receive data associated with operating parameters of one or more appliances within the dwelling;
transmit the second instruction to the appliance sensor; and
determine an appliance susceptibility value based on data received from the appliance sensor.

8. The system as recited in claim 7, wherein the server determines whether the at least one insurance dataset comprises at least one data record corresponding to the appliance susceptibility value.

9. The system as recited in claim 1, wherein the server is further configured to determine a maintenance score based on the structural susceptibility value.

10. The system as recited in claim 9, wherein the electronic message further comprises the maintenance score.

11. A method comprising:
generating, by a server, an instruction configured to receive data associated with structural movement of the dwelling;
transmitting, by the server, the instruction to a motion sensor from a plurality of electronic sensor devices, the instruction configured to initiate a data capture by the motion sensor, the plurality of electronic sensor devices associated with the dwelling configured to capture data relating to the dwelling and to electronically transmit captured data, the plurality of electronic sensor devices comprising at least a motion sensor configured to collect data associated with structural movement of the dwelling;
determining, by the server, a structural susceptibility value based on the data received from the motion sensor;
retrieving, by the server from a database, at least one insurance dataset corresponding to the dwelling, the database configured to store at least one insurance dataset corresponding to the dwelling, the at least one insurance dataset comprising one or more data records corresponding to one or more insurance coverages of one or more attributes of the dwelling;
determining, by the server, whether the at least one insurance dataset comprises at least one data record corresponding to the structural susceptibility value; and
transmitting, by the server, an electronic message configured to notify an electronic device associated with the dwelling, the electronic message comprising the structural susceptibility value and at least one corresponding insurance dataset excluded from the one or more insurance coverages.

12. The method as recited in claim 11, wherein the electronic device associated with the dwelling is an electronic sensor device.

13. The method as recited in claim 11, wherein the plurality of electronic sensor devices further comprises electronic sensor devices to detect at least one of temperature, humidity, water leak, wind speed, motion, electrical, positional, structural, environmental, appliance and image.

14. The method as recited in claim 11, wherein the electronic device associated with the dwelling is a mobile device associated with the dwelling.

15. The method as recited in claim 11, wherein the at least one insurance dataset excluded from the one or more insurance coverages corresponds to a coverage gap.

16. The method as recited in claim 11, wherein the plurality of electronic sensor devices further comprises an appliance sensor.

17. The method as recited in claim 16, further comprising:
   generating, by the server, a second instruction configured to receive data associated with operating parameters of one or more appliances within the dwelling;
   transmitting, by the server, the second instruction to the appliance sensor; and
   determining, by the server, an appliance susceptibility value based on data received from the appliance sensor.

18. The method as recited in claim 17, wherein the server determines whether the at least one insurance dataset comprises at least one data record corresponding to the appliance susceptibility value.

19. The method as recited in claim 11, further comprising:
   determining, by the server, a maintenance score based on the structural susceptibility value.

20. The method as recited in claim 19, wherein the electronic message further comprises the maintenance score.

* * * * *